(12) United States Patent
Purves

(10) Patent No.: US 11,763,294 B2
(45) Date of Patent: Sep. 19, 2023

(54) REMOTE DECOUPLED APPLICATION PERSISTENT STATE APPARATUSES, METHODS AND SYSTEMS

(71) Applicant: VISA INTERNATIONAL SERVICE ASSOCIATION, San Francisco, CA (US)

(72) Inventor: Thomas Purves, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 76 days.

(21) Appl. No.: 17/321,143

(22) Filed: May 14, 2021

(65) Prior Publication Data

US 2021/0272102 A1    Sep. 2, 2021

Related U.S. Application Data

(63) Continuation of application No. 16/283,251, filed on Feb. 22, 2019, now Pat. No. 11,010,756, which is a
(Continued)

(51) Int. Cl.
*G06Q 20/36*    (2012.01)
*H04L 67/306*    (2022.01)
(Continued)

(52) U.S. Cl.
CPC ......... *G06Q 20/363* (2013.01); *H04L 67/306* (2013.01); *H04L 67/535* (2022.05); *H04L 67/568* (2022.05)

(58) Field of Classification Search
CPC .................................................. G06Q 20/363
(Continued)

(56) References Cited

U.S. PATENT DOCUMENTS

| 789,106 A | 5/1905 | Seymour |
| 4,896,363 A | 1/1990 | Taylor |

(Continued)

FOREIGN PATENT DOCUMENTS

| CN | 1841425 A | 10/2006 |
| CN | 1922623 A | 2/2007 |

(Continued)

OTHER PUBLICATIONS

Aissi et al., U.S. Appl. No. 61/738,832 (unpublished), Management of Sensitive Data filed Dec. 18, 2012.
(Continued)

*Primary Examiner* — Lindsay M Maguire
(74) *Attorney, Agent, or Firm* — K&L Gates LLP

(57) ABSTRACT

A method including receiving a selection from a first user device associated with a user, creating and storing a first cookie associated with states of a user account of the user that reflects the selection, and receiving, from a second user device, a request for state data related to the states of the user account. The method includes identifying the first cookie in response to the request for state data and determining a platform type of the second user device. The method includes generating a second cookie compliant with the platform type of the second user device based on the first cookie. The method includes sending the generated second cookie to the second user device, the second cookie including instructions to present the selection on the second user device via the platform type of the second user device.

20 Claims, 11 Drawing Sheets

Related U.S. Application Data continuation of application No. 14/216,351, filed on Mar. 17, 2014, now Pat. No. 10,242,358, which is a continuation of application No. 13/624,779, filed on Sep. 21, 2012, now abandoned, which is a continuation-in-part of application No. 13/589,053, filed on Aug. 17, 2012, now abandoned.

(60) Provisional application No. 61/798,483, filed on Mar. 15, 2013, provisional application No. 61/668,441, filed on Jul. 5, 2012, provisional application No. 61/537,421, filed on Sep. 21, 2011, provisional application No. 61/525,168, filed on Aug. 18, 2011.

(51) Int. Cl.
*H04L 67/50* (2022.01)
*H04L 67/568* (2022.01)

(58) Field of Classification Search
USPC ....................................................... 705/26.8
See application file for complete search history.

(56) References Cited

U.S. PATENT DOCUMENTS

| | | |
|---|---|---|
| 5,177,342 A | 1/1993 | Adams |
| 5,221,838 A | 6/1993 | Gutman |
| 5,237,164 A | 8/1993 | Takada |
| 5,311,594 A | 5/1994 | Penzias |
| 5,383,113 A | 1/1995 | Kight |
| 5,384,449 A | 1/1995 | Peirce |
| 5,446,890 A | 8/1995 | Renslo |
| 5,459,656 A | 10/1995 | Fields |
| 5,500,513 A | 3/1996 | Langhans |
| 5,510,777 A | 4/1996 | Pilc |
| 5,521,362 A | 5/1996 | Powers |
| 5,526,409 A | 6/1996 | Conrow |
| 5,530,438 A | 6/1996 | Bickham |
| 5,536,045 A | 7/1996 | Adams |
| 5,590,038 A | 12/1996 | Pitroda |
| 5,613,012 A | 3/1997 | Hoffman |
| 5,615,110 A | 3/1997 | Wong |
| 5,615,264 A | 3/1997 | Kazmierczak |
| 5,621,201 A | 4/1997 | Langhans |
| 5,640,193 A | 6/1997 | Wellner |
| 5,649,118 A | 7/1997 | Carlisle |
| 5,655,007 A | 8/1997 | McAllister |
| 5,748,737 A | 5/1998 | Daggar |
| 5,781,438 A | 7/1998 | Lee |
| 5,796,832 A | 8/1998 | Kawan |
| 5,815,657 A | 9/1998 | Williams |
| 5,850,446 A | 12/1998 | Berger |
| 5,878,337 A | 3/1999 | Joao |
| 5,883,810 A | 3/1999 | Franklin |
| 5,884,271 A | 3/1999 | Pitroda |
| 5,892,838 A | 4/1999 | Brady |
| 5,903,830 A | 5/1999 | Joao |
| 5,914,472 A | 6/1999 | Foladare |
| 5,943,624 A | 8/1999 | Fox |
| 5,953,710 A | 9/1999 | Fleming |
| 5,956,699 A | 9/1999 | Wong |
| 5,963,924 A | 10/1999 | Williams |
| 6,000,832 A | 12/1999 | Franklin |
| 6,006,200 A | 12/1999 | Boies |
| 6,014,635 A | 1/2000 | Harris |
| 6,044,360 A | 3/2000 | Picciallo |
| 6,052,675 A | 4/2000 | Checchio |
| 6,064,990 A | 5/2000 | Goldsmith |
| 6,092,053 A | 7/2000 | Boesch |
| 6,160,903 A | 12/2000 | Hamid |
| 6,161,130 A | 12/2000 | Horvitz |
| 6,163,771 A | 12/2000 | Walker |
| 6,164,533 A | 12/2000 | Barton |
| 6,182,894 B1 | 2/2001 | Hackett |
| 6,193,155 B1 | 2/2001 | Walker |
| 6,195,447 B1 | 2/2001 | Ross |
| 6,202,052 B1 | 3/2001 | Miller |
| 6,202,933 B1 | 3/2001 | Poore |
| 6,226,624 B1 | 5/2001 | Watson |
| 6,227,447 B1 | 5/2001 | Campisano |
| 6,236,981 B1 | 5/2001 | Hill |
| 6,243,688 B1 | 6/2001 | Kalina |
| 6,263,447 B1 | 7/2001 | French |
| 6,267,292 B1 | 7/2001 | Walker |
| 6,327,578 B1 | 12/2001 | Linehan |
| 6,336,099 B1 | 1/2002 | Barnett |
| 6,339,766 B1 | 1/2002 | Gephart |
| 6,341,724 B2 | 1/2002 | Campisano |
| 6,381,584 B1 | 4/2002 | Ogram |
| 6,385,596 B1 | 5/2002 | Wiser |
| 6,385,655 B1 | 5/2002 | Smith |
| 6,422,462 B1 | 7/2002 | Cohen |
| 6,425,523 B1 | 7/2002 | Shem-Ur |
| 6,439,345 B1 | 8/2002 | Recktenwald |
| 6,456,984 B1 | 9/2002 | Demoff |
| 6,473,500 B1 | 10/2002 | Risafi |
| 6,529,725 B1 | 3/2003 | Joao |
| 6,535,855 B1 | 3/2003 | Cahill |
| 6,560,581 B1 | 5/2003 | Fox |
| 6,592,044 B1 | 7/2003 | Wong |
| 6,601,761 B1 | 8/2003 | Katis |
| 6,636,833 B1 | 10/2003 | Flitcroft |
| 6,735,572 B2 | 5/2004 | Landesmann |
| 6,748,367 B1 | 6/2004 | Lee |
| 6,805,287 B2 | 10/2004 | Bishop |
| 6,853,982 B2 | 2/2005 | Smith |
| 6,857,073 B2 | 2/2005 | French |
| 6,865,522 B1 | 3/2005 | Gastiger |
| 6,873,974 B1 | 3/2005 | Schutzer |
| 6,879,965 B2 | 4/2005 | Fung |
| 6,891,953 B1 | 5/2005 | Demello |
| 6,898,598 B2 | 5/2005 | Himmel |
| 6,901,387 B2 | 5/2005 | Wells |
| 6,925,439 B1 | 8/2005 | Pitroda |
| 6,931,382 B2 | 8/2005 | Laage |
| 6,934,528 B2 | 8/2005 | Loureiro |
| 6,938,019 B1 | 8/2005 | Uzo |
| 6,941,285 B2 | 9/2005 | Sarcanin |
| 6,944,595 B1 | 9/2005 | Graser |
| 6,980,670 B1 | 12/2005 | Hoffman |
| 6,990,470 B2 | 1/2006 | Hogan |
| 6,991,157 B2 | 1/2006 | Bishop |
| 6,999,943 B1 | 2/2006 | Johnson |
| 7,024,383 B1 | 4/2006 | Mancini |
| 7,028,052 B2 | 4/2006 | Chapman |
| 7,047,041 B2 | 5/2006 | Vanska |
| 7,051,002 B2 | 5/2006 | Keresman, III |
| 7,051,929 B2 | 5/2006 | Li |
| 7,069,249 B2 | 6/2006 | Stolfo |
| 7,089,208 B1 | 8/2006 | Levchin |
| 7,096,003 B2 | 8/2006 | Joao |
| 7,103,576 B2 | 9/2006 | Mann |
| 7,111,789 B2 | 9/2006 | Rajasekaran |
| 7,113,930 B2 | 9/2006 | Eccles |
| 7,117,172 B1 | 10/2006 | Black |
| 7,136,835 B1 | 11/2006 | Flitcroft |
| 7,155,411 B1 | 12/2006 | Blinn |
| 7,156,311 B2 | 1/2007 | Attia |
| 7,167,903 B2 | 1/2007 | Percival |
| 7,177,835 B1 | 2/2007 | Walker |
| 7,177,848 B2 | 2/2007 | Hogan |
| 7,180,457 B2 | 2/2007 | Trott |
| 7,194,437 B1 | 3/2007 | Britto |
| 7,206,847 B1 | 4/2007 | Alberth |
| 7,209,561 B1 | 4/2007 | Shankar |
| 7,212,979 B1 | 5/2007 | Matz |
| 7,228,011 B1 | 6/2007 | Queeno |
| RE39,736 E | 7/2007 | Morrill |
| 7,264,154 B2 | 9/2007 | Harris |
| 7,266,557 B2 | 9/2007 | Aschen |
| 7,268,667 B2 | 9/2007 | Beenau |
| 7,268,668 B2 | 9/2007 | Beenau |
| 7,287,692 B1 | 10/2007 | Patel |
| 7,290,704 B1 | 11/2007 | Ball |

(56) References Cited

U.S. PATENT DOCUMENTS

| | | |
|---|---|---|
| 7,292,999 B2 | 11/2007 | Hobson |
| 7,313,546 B2 | 12/2007 | Alarcon-Luther |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |
| 7,349,885 B2 | 3/2008 | Gangi |
| 7,350,230 B2 | 3/2008 | Forrest |
| 7,353,382 B2 | 4/2008 | Labrou |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 | 5/2008 | Junger |
| 7,379,919 B2 | 5/2008 | Hogan |
| 7,392,222 B1 | 6/2008 | Hamilton |
| RE40,444 E | 7/2008 | Linehan |
| 7,395,242 B2 | 7/2008 | Blinn |
| 7,398,250 B2 | 7/2008 | Blinn |
| 7,413,113 B1 | 8/2008 | Zhu |
| 7,415,443 B2 | 8/2008 | Hobson |
| 7,415,469 B2 | 8/2008 | Singh |
| 7,427,021 B2 | 9/2008 | Kemper |
| 7,444,676 B1 | 10/2008 | Asghari-Kamrani |
| 7,450,966 B2 | 11/2008 | Vanska |
| 7,469,151 B2 | 12/2008 | Khan |
| 7,477,780 B2 | 1/2009 | Boncyk |
| 7,499,889 B2 | 3/2009 | Golan |
| 7,500,607 B2 | 3/2009 | Williams |
| 7,505,935 B2 | 3/2009 | Mendiola |
| 7,533,064 B1 | 5/2009 | Boesch |
| 7,536,318 B1 | 5/2009 | Wolfe |
| 7,536,335 B1 | 5/2009 | Weston |
| 7,536,360 B2 | 5/2009 | Stolfo |
| 7,540,012 B1 | 5/2009 | Herzberg |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,140 B2 | 8/2009 | Weichert |
| 7,571,142 B1 | 8/2009 | Flitcroft |
| 7,580,898 B2 | 8/2009 | Brown |
| 7,584,153 B2 | 9/2009 | Brown |
| 7,593,858 B2 | 9/2009 | Matz |
| 7,593,896 B1 | 9/2009 | Flitcroft |
| 7,603,311 B1 | 10/2009 | Yadav-Ranjan |
| 7,606,560 B2 | 10/2009 | Labrou |
| 7,627,531 B2 | 12/2009 | Breck |
| 7,627,895 B2 | 12/2009 | Gifford |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,650,314 B1 | 1/2010 | Saunders |
| 7,660,749 B2 | 2/2010 | Koski |
| 7,664,733 B2 | 2/2010 | Erol |
| 7,668,754 B1 | 2/2010 | Bridgelall |
| 7,669,760 B1 | 3/2010 | Zettner |
| 7,676,434 B2 | 3/2010 | Evans |
| 7,685,037 B2 | 3/2010 | Reiners |
| 7,685,067 B1 | 3/2010 | Britto |
| 7,698,221 B2 | 4/2010 | Blinn |
| 7,702,578 B2 | 4/2010 | Fung |
| 7,707,113 B1 | 4/2010 | Dimartino |
| 7,707,120 B2 | 4/2010 | Dominguez |
| 7,708,194 B2 | 5/2010 | Vawter |
| 7,708,198 B2 | 5/2010 | Gangi |
| 7,712,655 B2 | 5/2010 | Wong |
| 7,712,658 B2 | 5/2010 | Gangi |
| 7,720,436 B2 | 5/2010 | Hamynen |
| 7,734,527 B2 | 6/2010 | Uzo |
| 7,739,194 B2 | 6/2010 | Blinn |
| 7,742,984 B2 | 6/2010 | Mohsenzadeh |
| 7,753,265 B2 | 7/2010 | Harris |
| 7,770,789 B2 | 8/2010 | Oder |
| 7,774,076 B2 | 8/2010 | Skowronek |
| 7,783,569 B2 | 8/2010 | Abel |
| 7,784,684 B2 | 8/2010 | Labrou |
| 7,784,685 B1 | 8/2010 | Hopkins |
| 7,793,851 B2 | 9/2010 | Mullen |
| 7,797,215 B1 | 9/2010 | Zfrenner |
| 7,801,826 B2 | 9/2010 | Labrou |
| 7,801,829 B2 | 9/2010 | Gray |
| 7,802,719 B2 | 9/2010 | Johnson |
| 7,805,376 B2 | 9/2010 | Smith |
| 7,805,378 B2 | 9/2010 | Berardi |
| 7,810,720 B2 | 10/2010 | Lovett |
| 7,818,264 B2 | 10/2010 | Hammad |
| 7,819,307 B2 | 10/2010 | Lyons |
| 7,827,288 B2 | 11/2010 | Da |
| 7,828,206 B2 | 11/2010 | Hessburg |
| 7,828,220 B2 | 11/2010 | Mullen |
| 7,828,992 B2 | 11/2010 | Kilickiran |
| 7,835,960 B2 | 11/2010 | Breck |
| 7,837,125 B2 | 11/2010 | Biskupski |
| 7,841,523 B2 | 11/2010 | Oder |
| 7,841,539 B2 | 11/2010 | Hewton |
| 7,844,530 B2 | 11/2010 | Ziade |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,870,027 B1 | 1/2011 | Tannenbaum |
| 7,873,579 B2 | 1/2011 | Hobson |
| 7,873,580 B2 | 1/2011 | Hobson |
| 7,877,299 B2 | 1/2011 | Bui |
| 7,878,400 B2 | 2/2011 | Harris |
| 7,890,370 B2 | 2/2011 | Whitsitt |
| 7,890,393 B2 | 2/2011 | Talbert |
| 7,891,563 B2 | 2/2011 | Oder |
| 7,895,119 B2 | 2/2011 | Praisner |
| 7,896,238 B2 | 3/2011 | Fein |
| 7,899,744 B2 | 3/2011 | Bishop |
| 7,904,360 B2 | 3/2011 | Evans |
| 7,908,216 B1 | 3/2011 | Davis |
| 7,908,227 B2 | 3/2011 | Zissimopoulos |
| 7,922,082 B2 | 4/2011 | Muscato |
| 7,926,714 B1 | 4/2011 | Zhu |
| 7,931,195 B2 | 4/2011 | Mullen |
| 7,933,779 B2 | 4/2011 | Rooks |
| 7,937,324 B2 | 5/2011 | Patterson |
| 7,938,318 B2 | 5/2011 | Fein |
| 7,942,337 B2 | 5/2011 | Jain |
| 7,954,705 B2 | 6/2011 | Mullen |
| 7,959,076 B1 | 6/2011 | Hopkins |
| 7,962,418 B1 | 6/2011 | Wei |
| 7,963,441 B2 | 6/2011 | Emmons |
| 7,967,196 B1 | 6/2011 | Bierbaum |
| 7,971,782 B1 | 7/2011 | Shams |
| 7,996,259 B1 | 8/2011 | Distefano, III |
| 7,996,288 B1 | 8/2011 | Stolfo |
| 8,016,192 B2 | 9/2011 | Messerges |
| 8,020,763 B1 | 9/2011 | Kowalchyk |
| 8,024,260 B1 | 9/2011 | Hogl |
| 8,025,223 B2 | 9/2011 | Saunders |
| 8,028,041 B2 | 9/2011 | Olliphant |
| 8,032,438 B1 | 10/2011 | Barton |
| 8,041,338 B2 | 10/2011 | Chen |
| 8,046,256 B2 | 10/2011 | Chien |
| 8,050,997 B1 | 11/2011 | Nosek |
| 8,060,413 B2 | 11/2011 | Castell |
| 8,060,448 B2 | 11/2011 | Jones |
| 8,060,449 B1 | 11/2011 | Zhu |
| 8,073,565 B2 | 12/2011 | Johnson |
| 8,074,876 B2 | 12/2011 | Foss |
| 8,074,877 B2 | 12/2011 | Mullen |
| 8,074,879 B2 | 12/2011 | Harris |
| 8,082,210 B2 | 12/2011 | Hansen |
| 8,090,351 B2 | 1/2012 | Klein |
| 8,095,113 B2 | 1/2012 | Kean |

(56) References Cited

U.S. PATENT DOCUMENTS

| | | |
|---|---|---|
| 8,095,602 B1 | 1/2012 | Orbach |
| 8,104,679 B2 | 1/2012 | Brown |
| 8,108,261 B2 | 1/2012 | Carlier |
| RE43,157 E | 2/2012 | Bishop |
| 8,109,436 B1 | 2/2012 | Hopkins |
| 8,117,127 B1 | 2/2012 | Sanders |
| 8,121,942 B2 | 2/2012 | Carlson |
| 8,121,956 B2 | 2/2012 | Carlson |
| 8,126,449 B2 | 2/2012 | Beenau |
| 8,127,982 B1 | 3/2012 | Casey |
| 8,131,666 B2 | 3/2012 | Obrien |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,171,525 B1 | 5/2012 | Pelly |
| 8,175,235 B2 | 5/2012 | Mumford |
| 8,175,965 B2 | 5/2012 | Moore |
| 8,175,967 B2 | 5/2012 | Oleary |
| 8,175,968 B2 | 5/2012 | Oleary |
| 8,175,973 B2 | 5/2012 | Davis |
| 8,175,975 B2 | 5/2012 | Cai |
| 8,175,979 B2 | 5/2012 | Baentsch |
| 8,176,416 B1 | 5/2012 | Williams |
| 8,176,554 B1 | 5/2012 | Kennedy |
| 8,179,563 B2 | 5/2012 | King |
| 8,180,289 B1 | 5/2012 | Glickman |
| 8,180,705 B2 | 5/2012 | Kowalchyk |
| 8,180,804 B1 | 5/2012 | Narayanan |
| 8,190,513 B2 | 5/2012 | Felger |
| 8,190,523 B2 | 5/2012 | Patterson |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,196,813 B2 | 6/2012 | Vadhri |
| 8,200,582 B1 | 6/2012 | Zhu |
| 8,200,868 B1 | 6/2012 | Maarten |
| 8,204,774 B2 | 6/2012 | Chwast |
| 8,204,829 B2 | 6/2012 | Alvarez |
| 8,205,791 B2 | 6/2012 | Randazza |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,489 B2 | 7/2012 | Patterson |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,385 B2 | 7/2012 | Chow |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,852 B2 | 7/2012 | Carlson |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,245,139 B2 | 8/2012 | Michelman |
| 8,249,925 B2 | 8/2012 | Broms |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,265,993 B2 | 9/2012 | Chien |
| 8,275,704 B2 | 9/2012 | Bishop |
| 8,280,777 B2 | 10/2012 | Mengerink |
| 8,281,991 B2 | 10/2012 | Wentker |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,321,364 B1 | 11/2012 | Gharpure |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,328,095 B2 | 12/2012 | Oder |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,336,088 B2 | 12/2012 | Raj |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,346,666 B2 | 1/2013 | Lindelsee |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |

(56) References Cited

U.S. PATENT DOCUMENTS

| | | |
|---|---|---|
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,376,225 B1 | 2/2013 | Hopkins |
| 8,380,177 B2 | 2/2013 | Laracey |
| 8,380,349 B1 | 2/2013 | Hickman |
| 8,386,078 B1 | 2/2013 | Hickman |
| 8,387,873 B2 | 3/2013 | Saunders |
| 8,396,750 B1 | 3/2013 | Hariharan |
| 8,396,810 B1 | 3/2013 | Cook |
| 8,401,539 B2 | 3/2013 | Beenau |
| 8,401,898 B2 | 3/2013 | Chien |
| 8,401,904 B1 | 3/2013 | Simakov |
| 8,402,555 B2 | 3/2013 | Grecia |
| 8,403,211 B2 | 3/2013 | Brooks |
| 8,412,586 B1 | 4/2013 | Foulser |
| 8,412,623 B2 | 4/2013 | Moon |
| 8,412,630 B2 | 4/2013 | Ross |
| 8,412,837 B1 | 4/2013 | Emigh |
| 8,417,633 B1 | 4/2013 | Chmara |
| 8,417,642 B2 | 4/2013 | Oren |
| 8,423,462 B1 | 4/2013 | Amacker |
| 8,429,521 B2 | 4/2013 | Lloyd |
| 8,437,633 B2 | 4/2013 | Chmara |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand |
| 8,504,478 B2 | 8/2013 | Saunders |
| 8,510,816 B2 | 8/2013 | Quach |
| 8,433,116 B2 | 9/2013 | Davis |
| 8,527,360 B2 | 9/2013 | Groat |
| 8,533,860 B1 | 9/2013 | Grecia |
| 8,538,845 B2 | 9/2013 | Liberty |
| 8,555,079 B2 | 10/2013 | Shablygin |
| 8,560,004 B1 | 10/2013 | Tsvetkov |
| 8,566,168 B1 | 10/2013 | Bierbaum |
| 8,567,670 B2 | 10/2013 | Stanfield |
| 8,571,937 B2 | 10/2013 | Rose |
| 8,571,939 B2 | 10/2013 | Lindsey |
| 8,577,336 B2 | 11/2013 | Mechaley |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,612,325 B2 | 12/2013 | Stacy |
| 8,615,468 B2 | 12/2013 | Varadarajan |
| 8,620,754 B2 | 12/2013 | Fisher |
| 8,627,420 B2 | 1/2014 | Furlan |
| 8,635,157 B2 | 1/2014 | Smith |
| 8,639,621 B1 | 1/2014 | Ellis |
| 8,646,059 B1 | 2/2014 | Von Behren |
| 8,651,374 B2 | 2/2014 | Brabson |
| 8,656,180 B2 | 2/2014 | Shablygin |
| 8,661,495 B2 | 2/2014 | Reisman |
| 8,662,384 B2 | 3/2014 | Dodin |
| 8,739,016 B1 | 5/2014 | Goldman |
| 8,751,391 B2 | 6/2014 | Freund |
| 8,762,263 B2 | 6/2014 | Gauthier |
| 8,793,186 B2 | 7/2014 | Patterson |
| 8,838,982 B2 | 9/2014 | Carlson |
| 8,856,539 B2 | 10/2014 | Weiss |
| 8,887,308 B2 | 11/2014 | Grecia |
| 8,893,009 B2 | 11/2014 | Raleigh |
| 9,008,616 B2 | 4/2015 | Wall |
| 9,065,643 B2 | 6/2015 | Hurry |
| 9,070,129 B2 | 6/2015 | Sheets |
| 9,082,119 B2 | 7/2015 | Ortiz |
| 9,100,826 B2 | 8/2015 | Weiss |
| 9,105,050 B2 | 8/2015 | Tietzen |
| 9,160,741 B2 | 10/2015 | Wentker |
| 9,195,750 B2 | 11/2015 | Hayden |
| 9,229,964 B2 | 1/2016 | Stevelinck |
| 9,245,267 B2 | 1/2016 | Singh |
| 9,249,241 B2 | 2/2016 | Dai |
| 9,256,871 B2 | 2/2016 | Anderson |
| 9,280,765 B2 | 3/2016 | Hammad |
| 9,307,342 B2 | 4/2016 | Sojoodi |
| 9,324,098 B1 | 4/2016 | Agrawal |
| 9,355,393 B2 | 5/2016 | Purves |
| 9,448,972 B2 | 9/2016 | Greenberg |
| 9,524,089 B1 | 12/2016 | Ghosh |
| 9,530,137 B2 | 12/2016 | Weiss |
| 9,582,598 B2 | 2/2017 | Kalgi |
| 9,626,351 B2 | 4/2017 | Davis |
| 9,710,807 B2 | 7/2017 | Theurer |
| 9,772,987 B2 | 9/2017 | Davis |
| 9,804,834 B1 | 10/2017 | Lopyrev |
| 9,830,328 B2 | 11/2017 | Faith |
| 9,830,590 B2 | 11/2017 | Grigg |
| 9,846,863 B2 | 12/2017 | Grossi |
| 9,904,537 B2 | 2/2018 | Lopyrev |
| 9,959,531 B2 | 5/2018 | Purves |
| 10,013,423 B2 | 7/2018 | Faith |
| 10,121,129 B2 | 11/2018 | Kalgi |
| 10,154,084 B2 | 12/2018 | Kalgi |
| 10,223,691 B2 | 3/2019 | Edward |
| 10,223,730 B2 | 3/2019 | Shastry |
| 10,242,358 B2 | 3/2019 | Purves |
| 10,262,001 B2 | 4/2019 | Faith |
| 10,354,240 B2 | 7/2019 | Purves |
| 10,360,561 B2 | 7/2019 | Poon |
| 10,419,529 B2 | 9/2019 | Kalgi |
| 10,430,381 B2 | 10/2019 | Faith |
| 10,586,227 B2 | 3/2020 | Makhdumi |
| 10,699,290 B1 | 6/2020 | Varadarajan |
| 10,803,449 B2 | 10/2020 | Kalgi |
| 10,825,001 B2 | 11/2020 | Purves |
| 10,983,960 B2 | 4/2021 | Faith |
| 11,010,753 B2 | 5/2021 | Kalgi |
| 11,010,756 B2 | 5/2021 | Purves |
| 11,023,886 B2 | 6/2021 | Edward |
| 11,036,681 B2 | 6/2021 | Faith |
| 11,037,138 B2 | 6/2021 | Theurer |
| 11,074,218 B2 | 7/2021 | Faith |
| 11,144,905 B1 | 10/2021 | Wilkinson |
| 11,288,661 B2 | 3/2022 | Hammad |
| 11,397,931 B2 | 7/2022 | Purves |
| 2001/0029485 A1 | 10/2001 | Brody |
| 2001/0034720 A1 | 10/2001 | Armes |
| 2001/0037297 A1 | 11/2001 | McNair |
| 2001/0049635 A1 | 12/2001 | Chung |
| 2001/0054003 A1 | 12/2001 | Chien |
| 2001/0056359 A1 | 12/2001 | Abreu |
| 2001/0056409 A1 | 12/2001 | Bellovin |
| 2002/0002522 A1 | 1/2002 | Clift |
| 2002/0004783 A1 | 1/2002 | Paltenghe |
| 2002/0007320 A1 | 1/2002 | Hogan |
| 2002/0016749 A1 | 2/2002 | Borecki |
| 2002/0026575 A1 | 2/2002 | Wheeler |
| 2002/0029193 A1 | 3/2002 | Ranjan |
| 2002/0035548 A1 | 3/2002 | Hogan |
| 2002/0040325 A1 | 4/2002 | Takae |
| 2002/0046184 A1 | 4/2002 | Villaret |
| 2002/0052778 A1 | 5/2002 | Murphy |
| 2002/0069122 A1 | 6/2002 | Yun |
| 2002/0073045 A1 | 6/2002 | Rubin |
| 2002/0077976 A1 | 6/2002 | Meyer |

(56) References Cited

U.S. PATENT DOCUMENTS

| | | |
|---|---|---|
| 2002/0077978 A1 | 6/2002 | Oleary |
| 2002/0087894 A1 | 7/2002 | Foley |
| 2002/0099642 A1 | 7/2002 | Schwanki |
| 2002/0099647 A1 | 7/2002 | Howorka |
| 2002/0099656 A1 | 7/2002 | Poh Wong |
| 2002/0107755 A1 | 8/2002 | Steed |
| 2002/0111919 A1 | 8/2002 | Weller |
| 2002/0112014 A1 | 8/2002 | Bennett |
| 2002/0116271 A1 | 8/2002 | Mankoff |
| 2002/0116341 A1 | 8/2002 | Hogan |
| 2002/0120864 A1 | 8/2002 | Wu |
| 2002/0128977 A1 | 9/2002 | Nambiar |
| 2002/0133467 A1 | 9/2002 | Hobson |
| 2002/0138290 A1 | 9/2002 | Metcalfe |
| 2002/0138445 A1 | 9/2002 | Laage |
| 2002/0141575 A1 | 10/2002 | Hird |
| 2002/0143614 A1 | 10/2002 | MacLean |
| 2002/0147913 A1 | 10/2002 | Lun Yip |
| 2002/0174030 A1 | 11/2002 | Praisner |
| 2002/0178370 A1 | 11/2002 | Gurevich |
| 2002/0194081 A1 | 12/2002 | Perkowski |
| 2003/0014307 A1 | 1/2003 | Heng |
| 2003/0018524 A1 | 1/2003 | Fishman |
| 2003/0026404 A1 | 2/2003 | Joyce |
| 2003/0028451 A1 | 2/2003 | Ananian |
| 2003/0028481 A1 | 2/2003 | Flitcroft |
| 2003/0055785 A1 | 3/2003 | Lahiri |
| 2003/0080185 A1 | 5/2003 | Werther |
| 2003/0097318 A1 | 5/2003 | Yu |
| 2003/0101134 A1 | 5/2003 | Liu |
| 2003/0126076 A1 | 7/2003 | Kwok |
| 2003/0130955 A1 | 7/2003 | Hawthorne |
| 2003/0144935 A1 | 7/2003 | Sobek |
| 2003/0174823 A1 | 9/2003 | Justice |
| 2003/0177361 A1 | 9/2003 | Wheeler |
| 2003/0179230 A1 | 9/2003 | Seidman |
| 2003/0191709 A1 | 10/2003 | Elston |
| 2003/0191711 A1 | 10/2003 | Jamison |
| 2003/0191945 A1 | 10/2003 | Keech |
| 2003/0195659 A1 | 10/2003 | Kasuga |
| 2003/0200142 A1 | 10/2003 | Hicks |
| 2003/0200184 A1 | 10/2003 | Dominguez |
| 2003/0212589 A1 | 11/2003 | Kish |
| 2003/0212642 A1 | 11/2003 | Weller |
| 2003/0216996 A1 | 11/2003 | Cummings |
| 2003/0220835 A1 | 11/2003 | Barnes |
| 2004/0010462 A1 | 1/2004 | Moon |
| 2004/0030601 A1 | 2/2004 | Pond |
| 2004/0050928 A1 | 3/2004 | Bishop |
| 2004/0059682 A1 | 3/2004 | Hasumi |
| 2004/0068443 A1 | 4/2004 | Hopson |
| 2004/0078332 A1 | 4/2004 | Ferguson |
| 2004/0093281 A1 | 5/2004 | Silverstein |
| 2004/0103037 A1 | 5/2004 | Wetmore |
| 2004/0103063 A1 | 5/2004 | Takayama |
| 2004/0111698 A1 | 6/2004 | Soong |
| 2004/0128197 A1 | 7/2004 | Bam |
| 2004/0138999 A1 | 7/2004 | Friedman |
| 2004/0139008 A1 | 7/2004 | Mascavage |
| 2004/0143532 A1 | 7/2004 | Lee |
| 2004/0148255 A1 | 7/2004 | Beck |
| 2004/0158532 A1 | 8/2004 | Breck |
| 2004/0204128 A1 | 10/2004 | Zakharia |
| 2004/0210449 A1 | 10/2004 | Breck |
| 2004/0210498 A1 | 10/2004 | Freund |
| 2004/0215560 A1 | 10/2004 | Amalraj |
| 2004/0215963 A1 | 10/2004 | Kaplan |
| 2004/0230536 A1 | 11/2004 | Fung |
| 2004/0232225 A1 | 11/2004 | Bishop |
| 2004/0236646 A1 | 11/2004 | Wu |
| 2004/0236819 A1 | 11/2004 | Anati |
| 2004/0243520 A1 | 12/2004 | Bishop |
| 2004/0254891 A1 | 12/2004 | Blinn |
| 2004/0260646 A1 | 12/2004 | Berardi |
| 2004/0267608 A1 | 12/2004 | Mansfield |
| 2004/0267655 A1 | 12/2004 | Davidowitz |
| 2004/0267878 A1 | 12/2004 | Osias |
| 2005/0010483 A1 | 1/2005 | Ling |
| 2005/0037735 A1 | 2/2005 | Courts |
| 2005/0038724 A1 | 2/2005 | Roever |
| 2005/0065819 A1 | 3/2005 | Pamela |
| 2005/0080730 A1 | 4/2005 | Sorrentino |
| 2005/0080732 A1 | 4/2005 | Warin |
| 2005/0080747 A1 | 4/2005 | Anderson |
| 2005/0080821 A1 | 4/2005 | Breil |
| 2005/0097320 A1 | 5/2005 | Golan |
| 2005/0101309 A1 | 5/2005 | Croome |
| 2005/0102188 A1 | 5/2005 | Hutchison |
| 2005/0108178 A1 | 5/2005 | York |
| 2005/0114784 A1 | 5/2005 | Spring |
| 2005/0137969 A1 | 6/2005 | Shah |
| 2005/0144082 A1 | 6/2005 | Coolman |
| 2005/0171894 A1 | 8/2005 | Traynor |
| 2005/0171898 A1 | 8/2005 | Bishop |
| 2005/0184145 A1 | 8/2005 | Law |
| 2005/0187873 A1 | 8/2005 | Labrou |
| 2005/0192893 A1 | 9/2005 | Keeling |
| 2005/0192895 A1 | 9/2005 | Rogers |
| 2005/0199709 A1 | 9/2005 | Linlor |
| 2005/0220326 A1 | 10/2005 | Sim |
| 2005/0234817 A1 | 10/2005 | Vanfleet |
| 2005/0246278 A1 | 11/2005 | Gerber |
| 2005/0246293 A1 | 11/2005 | Ong |
| 2005/0251446 A1 | 11/2005 | Jiang |
| 2005/0254714 A1 | 11/2005 | Anne |
| 2005/0256802 A1 | 11/2005 | Ammermann |
| 2005/0261967 A1 | 11/2005 | Barry |
| 2005/0269401 A1 | 12/2005 | Spitzer |
| 2005/0269402 A1 | 12/2005 | Spitzer |
| 2005/0273462 A1 | 12/2005 | Reed |
| 2006/0002607 A1 | 1/2006 | Boncyk |
| 2006/0020542 A1 | 1/2006 | Litle |
| 2006/0053056 A1 | 3/2006 | Alspach-Goss |
| 2006/0059277 A1 | 3/2006 | Zito |
| 2006/0069619 A1 | 3/2006 | Walker |
| 2006/0075235 A1 | 4/2006 | Renkis |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178918 A1 | 8/2006 | Mikurak |
| 2006/0178986 A1 | 8/2006 | Giordano |
| 2006/0178994 A1 | 8/2006 | Stolfo |
| 2006/0190347 A1 | 8/2006 | Cuervo |
| 2006/0195598 A1 | 8/2006 | Fujita |
| 2006/0208060 A1 | 9/2006 | Mendelovich |
| 2006/0212434 A1 | 9/2006 | Crawford |
| 2006/0226216 A1 | 10/2006 | Keithley |
| 2006/0235795 A1 | 10/2006 | Johnson |
| 2006/0237528 A1 | 10/2006 | Bishop |
| 2006/0247982 A1 | 11/2006 | Stolfo |
| 2006/0277143 A1 | 12/2006 | Almonte |
| 2006/0278704 A1 | 12/2006 | Saunders |
| 2006/0282332 A1 | 12/2006 | Pfleging |
| 2006/0293947 A1 | 12/2006 | Nicholson |
| 2007/0011025 A1 | 1/2007 | Cracchiolo |
| 2007/0016523 A1 | 1/2007 | Blair |
| 2007/0022007 A1 | 1/2007 | Lawe |
| 2007/0038515 A1 | 2/2007 | Postrel |
| 2007/0038516 A1 | 2/2007 | Apple |
| 2007/0055571 A1 | 3/2007 | Fox |
| 2007/0067215 A1 | 3/2007 | Agarwal |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106504 A1 | 5/2007 | Deng |
| 2007/0106607 A1 | 5/2007 | Seib |
| 2007/0106627 A1 | 5/2007 | Srivastava |
| 2007/0107044 A1 | 5/2007 | Yuen |
| 2007/0113289 A1 | 5/2007 | Blumenau |
| 2007/0125840 A1 | 6/2007 | Law |
| 2007/0129955 A1 | 6/2007 | Dalmia |

(56) References Cited

U.S. PATENT DOCUMENTS

| | | |
|---|---|---|
| 2007/0136193 A1 | 6/2007 | Starr |
| 2007/0136211 A1 | 6/2007 | Brown |
| 2007/0143204 A1 | 6/2007 | Claus |
| 2007/0150413 A1 | 6/2007 | Morgenstern |
| 2007/0156726 A1 | 7/2007 | Levy |
| 2007/0162350 A1 | 7/2007 | Friedman |
| 2007/0170247 A1 | 7/2007 | Friedman |
| 2007/0179885 A1 | 8/2007 | Bird |
| 2007/0180119 A1 | 8/2007 | Khivesara |
| 2007/0198435 A1 | 8/2007 | Siegal |
| 2007/0198587 A1 | 8/2007 | Kobayasfii |
| 2007/0208662 A1 | 9/2007 | Jeronimus |
| 2007/0208671 A1 | 9/2007 | Brown |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0233615 A1 | 10/2007 | Tumminaro |
| 2007/0239502 A1 | 10/2007 | Babu |
| 2007/0245414 A1 | 10/2007 | Chan |
| 2007/0276765 A1 | 11/2007 | Hazel |
| 2007/0288377 A1 | 12/2007 | Shaked |
| 2007/0291995 A1 | 12/2007 | Rivera |
| 2008/0004116 A1 | 1/2008 | Van |
| 2008/0004952 A1 | 1/2008 | Koli |
| 2008/0010096 A1 | 1/2008 | Patterson |
| 2008/0013335 A1 | 1/2008 | Tsutsumi |
| 2008/0015988 A1 | 1/2008 | Brown |
| 2008/0021829 A1 | 1/2008 | Kranzley |
| 2008/0027218 A1 | 1/2008 | Daugs |
| 2008/0027850 A1 | 1/2008 | Brittan |
| 2008/0029607 A1 | 2/2008 | Mullen |
| 2008/0035738 A1 | 2/2008 | Mullen |
| 2008/0048022 A1 | 2/2008 | Vawter |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0059370 A1 | 3/2008 | Sada |
| 2008/0065554 A1 | 3/2008 | Hogan |
| 2008/0065555 A1 | 3/2008 | Mullen |
| 2008/0077489 A1 | 3/2008 | Gilley |
| 2008/0082424 A1 | 4/2008 | Walton |
| 2008/0086365 A1 | 4/2008 | Zollino |
| 2008/0090513 A1 | 4/2008 | Collins |
| 2008/0091553 A1 | 4/2008 | Koski |
| 2008/0091616 A1 | 4/2008 | Helwin |
| 2008/0097856 A1 | 4/2008 | Blagg |
| 2008/0103795 A1 | 5/2008 | Jakubowski |
| 2008/0114639 A1 | 5/2008 | Meek |
| 2008/0114737 A1 | 5/2008 | Neely |
| 2008/0126145 A1 | 5/2008 | Racklet, III |
| 2008/0133351 A1 | 6/2008 | White |
| 2008/0133403 A1 | 6/2008 | Hamzeh |
| 2008/0140568 A1 | 6/2008 | Henry |
| 2008/0140684 A1 | 6/2008 | OReilly |
| 2008/0147883 A1 | 6/2008 | Philyaw |
| 2008/0154623 A1 | 6/2008 | Derker |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0201232 A1 | 8/2008 | Walker |
| 2008/0201264 A1 | 8/2008 | Brown |
| 2008/0201265 A1 | 8/2008 | Hewton |
| 2008/0221945 A1 | 9/2008 | Pace |
| 2008/0223918 A1 | 9/2008 | Williams |
| 2008/0228646 A1 | 9/2008 | Myers |
| 2008/0229217 A1 | 9/2008 | Kembel |
| 2008/0235261 A1 | 9/2008 | Malek |
| 2008/0024561 A1 | 10/2008 | Maeda |
| 2008/0243305 A1 | 10/2008 | Lee |
| 2008/0243702 A1 | 10/2008 | Hart |
| 2008/0245855 A1 | 10/2008 | Fein |
| 2008/0245861 A1 | 10/2008 | Fein |
| 2008/0270300 A1 | 10/2008 | Jones |
| 2008/0272188 A1 | 11/2008 | Keithley |
| 2008/0283591 A1 | 11/2008 | Oder |
| 2008/0288376 A1 | 11/2008 | Panthaki |
| 2008/0288889 A1 | 11/2008 | Hunt |
| 2008/0300980 A1 | 12/2008 | Benjamin |
| 2008/0301055 A1 | 12/2008 | Borgs |
| 2008/0302869 A1 | 12/2008 | Mullen |
| 2008/0302876 A1 | 12/2008 | Mullen |
| 2008/0313264 A1 | 12/2008 | Pestoni |
| 2008/0319905 A1 | 12/2008 | Carlson |
| 2009/0006181 A1 | 1/2009 | Ghosh |
| 2009/0006262 A1 | 1/2009 | Brown |
| 2009/0010488 A1 | 1/2009 | Matsuoka |
| 2009/0013266 A1 | 1/2009 | Gandhi |
| 2009/0018895 A1 | 1/2009 | Weinblatt |
| 2009/0024527 A1 | 1/2009 | Sellen |
| 2009/0024636 A1 | 1/2009 | Shiloh |
| 2009/0037255 A1 | 2/2009 | Chiu |
| 2009/0037326 A1 | 2/2009 | Chitti |
| 2009/0037333 A1 | 2/2009 | Flitcroft |
| 2009/0037388 A1 | 2/2009 | Cooper |
| 2009/0043702 A1 | 2/2009 | Bennett |
| 2009/0048934 A1 | 2/2009 | Haddad |
| 2009/0048971 A1 | 2/2009 | Hathaway |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0083065 A1 | 3/2009 | Unland |
| 2009/0089176 A1 | 4/2009 | McCabe |
| 2009/0089193 A1 | 4/2009 | Paintin |
| 2009/0104888 A1 | 4/2009 | Cox |
| 2009/0106112 A1 | 4/2009 | Dalmia |
| 2009/0106151 A1 | 4/2009 | Nelsen |
| 2009/0106160 A1 | 4/2009 | Skowronek |
| 2009/0106234 A1 | 4/2009 | Siedlecki |
| 2009/0108080 A1 | 4/2009 | Meyer |
| 2009/0112775 A1 | 4/2009 | Chiulli |
| 2009/0119176 A1 | 5/2009 | Johnson |
| 2009/0119190 A1 | 5/2009 | Realini |
| 2009/0119211 A1 | 5/2009 | Johnson |
| 2009/0125429 A1 | 5/2009 | Takayama |
| 2009/0132347 A1 | 5/2009 | Anderson |
| 2009/0132366 A1 | 5/2009 | Lam |
| 2009/0132395 A1 | 5/2009 | Lam |
| 2009/0134217 A1 | 5/2009 | Flitcroft |
| 2009/0144104 A1 | 6/2009 | Johnson |
| 2009/0144201 A1 | 6/2009 | Gierkink |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0164344 A1 | 6/2009 | Shiftan |
| 2009/0170608 A1 | 7/2009 | Herrmann |
| 2009/0171778 A1 | 7/2009 | Powell |
| 2009/0173782 A1 | 7/2009 | Muscato |
| 2009/0182664 A1 | 7/2009 | Trombley |
| 2009/0187492 A1 | 7/2009 | Hammad |
| 2009/0200371 A1 | 8/2009 | Kean |
| 2009/0210300 A1 | 8/2009 | Cansler |
| 2009/0216910 A1 | 8/2009 | Duchesneau |
| 2009/0222347 A1 | 9/2009 | Whitten |
| 2009/0228211 A1 | 9/2009 | Rasanen |
| 2009/0233579 A1 | 9/2009 | Castell |
| 2009/0234751 A1 | 9/2009 | Chan |
| 2009/0240620 A1 | 9/2009 | Kendrick |
| 2009/0241159 A1 | 9/2009 | Campagna |
| 2009/0248583 A1 | 10/2009 | Chhabra |
| 2009/0248738 A1 | 10/2009 | Martinez |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271246 A1 | 10/2009 | Alvarez |
| 2009/0271265 A1 | 10/2009 | Lay |

(56) References Cited

U.S. PATENT DOCUMENTS

| | | |
|---|---|---|
| 2009/0271635 A1 | 10/2009 | Liu |
| 2009/0276347 A1 | 11/2009 | Kargman |
| 2009/0281948 A1 | 11/2009 | Carlson |
| 2009/0288012 A1 | 11/2009 | Hertel |
| 2009/0294527 A1 | 12/2009 | Brabson |
| 2009/0307060 A1 | 12/2009 | Merz |
| 2009/0307135 A1 | 12/2009 | Gupta |
| 2009/0307139 A1 | 12/2009 | Mardikar |
| 2009/0308921 A1 | 12/2009 | Mullen |
| 2009/0313132 A1 | 12/2009 | McKenna |
| 2009/0319638 A1 | 12/2009 | Faith |
| 2009/0327045 A1 | 12/2009 | Olives |
| 2009/0327088 A1 | 12/2009 | Puthupparambil |
| 2009/0327131 A1 | 12/2009 | Beenau |
| 2010/0004989 A1 | 1/2010 | Bonalle |
| 2010/0005025 A1 | 1/2010 | Kumar |
| 2010/0008535 A1 | 1/2010 | Abulafia |
| 2010/0009663 A1 | 1/2010 | Chang |
| 2010/0010964 A1 | 1/2010 | Skowronek |
| 2010/0012728 A1 | 1/2010 | Rosset |
| 2010/0021149 A1 | 1/2010 | Mulder |
| 2010/0023386 A1 | 1/2010 | Avisar |
| 2010/0023455 A1 | 1/2010 | Dispensa |
| 2010/0023457 A1 | 1/2010 | Riviere |
| 2010/0036741 A1 | 2/2010 | Cleven |
| 2010/0036775 A1 | 2/2010 | Edens |
| 2010/0036884 A1 | 2/2010 | Brown |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0057548 A1 | 3/2010 | Edwards |
| 2010/0063903 A1 | 3/2010 | Whipple |
| 2010/0070359 A1 | 3/2010 | Heasley |
| 2010/0076873 A1 | 3/2010 | Taylor |
| 2010/0076890 A1 | 3/2010 | Low |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0088237 A1 | 4/2010 | Wankmueller |
| 2010/0094730 A1 | 4/2010 | Koski |
| 2010/0094755 A1 | 4/2010 | Kloster |
| 2010/0094878 A1 | 4/2010 | Soroca |
| 2010/0100480 A1 | 4/2010 | Altman |
| 2010/0106602 A1 | 4/2010 | Fuzell-Casey |
| 2010/0106644 A1 | 4/2010 | Annan |
| 2010/0114664 A1 | 5/2010 | Jobin |
| 2010/0120408 A1 | 5/2010 | Beenau |
| 2010/0121707 A1 | 5/2010 | Goeldi |
| 2010/0125492 A1 | 5/2010 | Lin |
| 2010/0125495 A1 | 5/2010 | Smith |
| 2010/0125509 A1 | 5/2010 | Kranzley |
| 2010/0125803 A1 | 5/2010 | Johnson |
| 2010/0131347 A1 | 5/2010 | Sarptipi |
| 2010/0131415 A1 | 5/2010 | Sartipi |
| 2010/0133334 A1 | 6/2010 | Vadhri |
| 2010/0133339 A1 | 6/2010 | Gibson |
| 2010/0138026 A1 | 6/2010 | Kaushal |
| 2010/0138347 A1 | 6/2010 | Chen |
| 2010/0145860 A1 | 6/2010 | Pelegero |
| 2010/0153865 A1 | 6/2010 | Barnes |
| 2010/0155470 A1 | 6/2010 | Woronec |
| 2010/0161433 A1 | 6/2010 | White |
| 2010/0162126 A1 | 6/2010 | Donaldson |
| 2010/0174599 A1 | 7/2010 | Rosenblatt |
| 2010/0179855 A1 | 7/2010 | Chen |
| 2010/0185505 A1 | 7/2010 | Sprogoe |
| 2010/0185531 A1 | 7/2010 | Van |
| 2010/0185545 A1 | 7/2010 | Royyuru |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D'Angelo et al. |
| 2010/0211469 A1 | 8/2010 | Salmon |
| 2010/0211499 A1 | 8/2010 | Zanzot |
| 2010/0211505 A1 | 8/2010 | Saunders |
| 2010/0217613 A1 | 8/2010 | Kelly |
| 2010/0217682 A1 | 8/2010 | Chan |
| 2010/0223186 A1 | 9/2010 | Hogan |
| 2010/0228668 A1 | 9/2010 | Hogan |
| 2010/0235284 A1 | 9/2010 | Moore |
| 2010/0243728 A1 | 9/2010 | Wiesman |
| 2010/0250351 A1 | 9/2010 | Gillenson |
| 2010/0256976 A1 | 10/2010 | Atsmon |
| 2010/0258620 A1 | 10/2010 | Torreyson |
| 2010/0268645 A1 | 10/2010 | Martino |
| 2010/0276484 A1 | 11/2010 | Banerjee |
| 2010/0287048 A1 | 11/2010 | Ramer |
| 2010/0287229 A1 | 11/2010 | Hauser |
| 2010/0291904 A1 | 11/2010 | Musfeldt |
| 2010/0293032 A1 | 11/2010 | Engelsma |
| 2010/0299267 A1 | 11/2010 | Faith |
| 2010/0299292 A1 | 11/2010 | Collazo |
| 2010/0305848 A1 | 12/2010 | Stallman |
| 2010/0306075 A1 | 12/2010 | Drance |
| 2010/0306076 A1 | 12/2010 | Taveau |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0312724 A1 | 12/2010 | Pinckney |
| 2010/0325041 A1 | 12/2010 | Berardi |
| 2010/0332262 A1 | 12/2010 | Horvitz |
| 2010/0332283 A1 | 12/2010 | Ng |
| 2011/0004498 A1 | 1/2011 | Readshaw |
| 2011/0010292 A1 | 1/2011 | Giordano |
| 2011/0016047 A1 | 1/2011 | Wu |
| 2011/0016320 A1 | 1/2011 | Bergsten |
| 2011/0035273 A1 | 2/2011 | Parikh |
| 2011/0040640 A1 | 2/2011 | Erikson |
| 2011/0040655 A1 | 2/2011 | Hendrickson |
| 2011/0047017 A1 | 2/2011 | Lieblang |
| 2011/0047075 A1 | 2/2011 | Fourez |
| 2011/0047076 A1 | 2/2011 | Carlson |
| 2011/0078082 A1 | 3/2011 | Gupta |
| 2011/0082789 A1 | 4/2011 | Boyd |
| 2011/0083018 A1 | 4/2011 | Kesanupalli |
| 2011/0087596 A1 | 4/2011 | Dorsey |
| 2011/0087726 A1 | 4/2011 | Shim |
| 2011/0093335 A1 | 4/2011 | Fordyce |
| 2011/0093397 A1 | 4/2011 | Carlson |
| 2011/0099057 A1 | 4/2011 | Tenyer |
| 2011/0105183 A1 | 5/2011 | Hsiao |
| 2011/0106698 A1 | 5/2011 | Issacson |
| 2011/0109737 A1 | 5/2011 | Aben |
| 2011/0119300 A1 | 5/2011 | Marcade |
| 2011/0125597 A1 | 5/2011 | Oder |
| 2011/0137740 A1 | 6/2011 | Bhattacharya |
| 2011/0137742 A1 | 6/2011 | Parikh |
| 2011/0153437 A1 | 6/2011 | Archer |
| 2011/0153498 A1 | 6/2011 | Makhotin |
| 2011/0154466 A1 | 6/2011 | Harper |
| 2011/0161233 A1 | 6/2011 | Tieken |
| 2011/0178896 A1 | 7/2011 | Nakajima |
| 2011/0178926 A1 | 7/2011 | Lindelsee |
| 2011/0180598 A1 | 7/2011 | Morgan |
| 2011/0184827 A1 | 7/2011 | Hubert |
| 2011/0191244 A1 | 8/2011 | Dai |
| 2011/0208418 A1 | 8/2011 | Looney |
| 2011/0215146 A1 | 9/2011 | Shams |
| 2011/0218870 A1 | 9/2011 | Shams |
| 2011/0221692 A1 | 9/2011 | Seydoux |
| 2011/0238474 A1 | 9/2011 | Carr |
| 2011/0238511 A1 | 9/2011 | Park |

(56) References Cited

U.S. PATENT DOCUMENTS

| | | |
|---|---|---|
| 2011/0238573 A1 | 9/2011 | Varadarajan |
| 2011/0246290 A1 | 10/2011 | Howard |
| 2011/0246317 A1 | 10/2011 | Coppinger |
| 2011/0251892 A1 | 10/2011 | Laracey |
| 2011/0258049 A1 | 10/2011 | Ramer |
| 2011/0258111 A1 | 10/2011 | Raj |
| 2011/0258123 A1 | 10/2011 | Dawkins |
| 2011/0270665 A1 | 11/2011 | Kim |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0282780 A1 | 11/2011 | French |
| 2011/0288684 A1 | 11/2011 | Farlow |
| 2011/0295745 A1 | 12/2011 | White |
| 2011/0296508 A1 | 12/2011 | Os |
| 2011/0302081 A1 | 12/2011 | Saunders |
| 2011/0312423 A1 | 12/2011 | Mosites |
| 2011/0320344 A1 | 12/2011 | Faith |
| 2011/0320345 A1 | 12/2011 | Taveau |
| 2012/0005026 A1 | 1/2012 | Khan |
| 2012/0011009 A1 | 1/2012 | Lindsey |
| 2012/0011063 A1 | 1/2012 | Killian |
| 2012/0016731 A1 | 1/2012 | Smith |
| 2012/0022943 A1 | 1/2012 | Howard |
| 2012/0023026 A1 | 1/2012 | Chen |
| 2012/0023417 A1 | 1/2012 | Nesladek |
| 2012/0023567 A1 | 1/2012 | Hammad |
| 2012/0028609 A1 | 2/2012 | Hruska |
| 2012/0030047 A1 | 2/2012 | Fuentes |
| 2012/0030101 A1 | 2/2012 | Boyd |
| 2012/0035998 A1 | 2/2012 | Chien |
| 2012/0036071 A1 | 2/2012 | Fulton |
| 2012/0041881 A1 | 2/2012 | Basu |
| 2012/0047237 A1 | 2/2012 | Arvidsson |
| 2012/0066065 A1 | 3/2012 | Switzer |
| 2012/0066078 A1 | 3/2012 | Kingston |
| 2012/0072311 A1 | 3/2012 | Khan |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0084132 A1 | 4/2012 | Khan |
| 2012/0084204 A1 | 4/2012 | Castell |
| 2012/0095852 A1 | 4/2012 | Bauer |
| 2012/0095865 A1 | 4/2012 | Doherty |
| 2012/0095895 A1 | 4/2012 | Aston |
| 2012/0101881 A1 | 4/2012 | Taylor |
| 2012/0110044 A1 | 5/2012 | Pal |
| 2012/0116902 A1 | 5/2012 | Cardina |
| 2012/0116966 A1 | 5/2012 | Tan |
| 2012/0118950 A1 | 5/2012 | Belk |
| 2012/0123838 A1 | 5/2012 | Sparks |
| 2012/0123882 A1 | 5/2012 | Carlson |
| 2012/0123924 A1 | 5/2012 | Rose |
| 2012/0123940 A1 | 5/2012 | Killian |
| 2012/0124496 A1 | 5/2012 | Rose |
| 2012/0129514 A1 | 5/2012 | Beenau |
| 2012/0130794 A1 | 5/2012 | Strieder |
| 2012/0136780 A1 | 5/2012 | El-Awady |
| 2012/0143706 A1 | 6/2012 | Crake |
| 2012/0143767 A1 | 6/2012 | Abadir |
| 2012/0143772 A1 | 6/2012 | Abadir |
| 2012/0150750 A1 | 6/2012 | Law |
| 2012/0158580 A1 | 6/2012 | Eram |
| 2012/0158589 A1 | 6/2012 | Katzin |
| 2012/0158593 A1 | 6/2012 | Garfinkle |
| 2012/0158792 A1 | 6/2012 | MacLaurin |
| 2012/0158893 A1 | 6/2012 | Boyns |
| 2012/0159163 A1 | 6/2012 | Von Behren |
| 2012/0165978 A1 | 6/2012 | Li |
| 2012/0166333 A1 | 6/2012 | Von Behren |
| 2012/0166655 A1 | 6/2012 | Maddali |
| 2012/0173431 A1 | 7/2012 | Ritchie |
| 2012/0173962 A1 | 7/2012 | Oh |
| 2012/0185386 A1 | 7/2012 | Salama |
| 2012/0190386 A1 | 7/2012 | Anderson |
| 2012/0197691 A1 | 8/2012 | Grigg |
| 2012/0197794 A1 | 8/2012 | Grigg |
| 2012/0197807 A1 | 8/2012 | Schlesser |
| 2012/0203662 A1 | 8/2012 | Morgan |
| 2012/0203664 A1 | 8/2012 | Torossian |
| 2012/0203665 A1 | 8/2012 | Morgan |
| 2012/0203666 A1 | 8/2012 | Torossian |
| 2012/0203673 A1 | 8/2012 | Morgan |
| 2012/0209735 A1 | 8/2012 | Subramanian |
| 2012/0209749 A1 | 8/2012 | Hammad |
| 2012/0209773 A1 | 8/2012 | Ranganathan |
| 2012/0215640 A1 | 8/2012 | Ramer |
| 2012/0215648 A1 | 8/2012 | Rose |
| 2012/0215650 A1 | 8/2012 | Oba |
| 2012/0215684 A1 | 8/2012 | Kidron |
| 2012/0215688 A1 | 8/2012 | Musser |
| 2012/0215696 A1 | 8/2012 | Salonen |
| 2012/0221421 A1 | 8/2012 | Hammad |
| 2012/0221502 A1 | 8/2012 | Jerram |
| 2012/0226582 A1 | 9/2012 | Hammad |
| 2012/0231844 A1 | 9/2012 | Coppinger |
| 2012/0233004 A1 | 9/2012 | Bercaw |
| 2012/0233073 A1 | 9/2012 | Salmon |
| 2012/0233170 A1 | 9/2012 | Musgrove |
| 2012/0239417 A1 | 9/2012 | Pourfallah |
| 2012/0239556 A1 | 9/2012 | Magruder |
| 2012/0239560 A1 | 9/2012 | Pourfallah |
| 2012/0246070 A1 | 9/2012 | Vadhri |
| 2012/0246071 A1 | 9/2012 | Jain |
| 2012/0246079 A1 | 9/2012 | Wilson |
| 2012/0254108 A1 | 10/2012 | Wedewer |
| 2012/0259763 A1 | 10/2012 | Pessin |
| 2012/0265631 A1 | 10/2012 | Cronic |
| 2012/0265685 A1 | 10/2012 | Brudnicki |
| 2012/0271770 A1 | 10/2012 | Harris |
| 2012/0284035 A1 | 11/2012 | Gillin |
| 2012/0290472 A1 | 11/2012 | Mullen |
| 2012/0297446 A1 | 11/2012 | Webb |
| 2012/0300932 A1 | 11/2012 | Cambridge |
| 2012/0303425 A1 | 11/2012 | Katzin |
| 2012/0303503 A1 | 11/2012 | Cambridge |
| 2012/0303736 A1 | 11/2012 | Novotny |
| 2012/0303961 A1 | 11/2012 | Kean |
| 2012/0304273 A1 | 11/2012 | Bailey |
| 2012/0310725 A1 | 12/2012 | Chien |
| 2012/0310826 A1 | 12/2012 | Chatterjee |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0317149 A1 | 12/2012 | Jagota |
| 2012/0323664 A1 | 12/2012 | Klems |
| 2012/0330874 A1 | 12/2012 | Jerram |
| 2013/0013499 A1 | 1/2013 | Kalgi |
| 2013/0017784 A1 | 1/2013 | Fisher |
| 2013/0018757 A1 | 1/2013 | Anderson |
| 2013/0019098 A1 | 1/2013 | Gupta |
| 2013/0024364 A1 | 1/2013 | Shrivastava |
| 2013/0024371 A1 | 1/2013 | Hariramani |
| 2013/0024916 A1 | 1/2013 | Evans |
| 2013/0030828 A1 | 1/2013 | Pourfallah |
| 2013/0030964 A1 | 1/2013 | Nuzzi |
| 2013/0031006 A1 | 1/2013 | McCullagh |
| 2013/0054337 A1 | 2/2013 | Brendell |
| 2013/0054454 A1 | 2/2013 | Purves |
| 2013/0054466 A1 | 2/2013 | Muscato |
| 2013/0054470 A1 | 2/2013 | Campos |
| 2013/0054474 A1 | 2/2013 | Yeager |
| 2013/0080238 A1 | 3/2013 | Kelly |
| 2013/0081122 A1 | 3/2013 | Svigals |
| 2013/0085877 A1 | 4/2013 | Andreas |
| 2013/0090750 A1 | 4/2013 | Herrman |
| 2013/0091028 A1 | 4/2013 | Oder |
| 2013/0103574 A1 | 4/2013 | Conrad |
| 2013/0110658 A1 | 5/2013 | Lyman |

(56) References Cited

U.S. PATENT DOCUMENTS

| | | |
|---|---|---|
| 2013/0110678 A1 | 5/2013 | Vigier |
| 2013/0111599 A1 | 5/2013 | Gargiulo |
| 2013/0117170 A1 | 5/2013 | Coppinger |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144785 A1 | 6/2013 | Karpenko |
| 2013/0144888 A1 | 6/2013 | Faith |
| 2013/0144957 A1 | 6/2013 | Sherman |
| 2013/0145148 A1 | 6/2013 | Shablygin |
| 2013/0145172 A1 | 6/2013 | Shablygin |
| 2013/0151417 A1 | 6/2013 | Gupta |
| 2013/0159081 A1 | 6/2013 | Shastry |
| 2013/0159112 A1 | 6/2013 | Schultz |
| 2013/0159154 A1 | 6/2013 | Purves |
| 2013/0159178 A1 | 6/2013 | Colon |
| 2013/0159184 A1 | 6/2013 | Thaw |
| 2013/0159196 A1 | 6/2013 | Dizoglio |
| 2013/0166332 A1 | 6/2013 | Hammad |
| 2013/0166402 A1 | 6/2013 | Parento |
| 2013/0166456 A1 | 6/2013 | Zhang |
| 2013/0166621 A1 | 6/2013 | Zhu |
| 2013/0173404 A1 | 7/2013 | Scipioni |
| 2013/0173736 A1 | 7/2013 | Krzeminski |
| 2013/0179340 A1 | 7/2013 | Alba |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson |
| 2013/0200146 A1 | 8/2013 | Moghadam |
| 2013/0204776 A1 | 8/2013 | King |
| 2013/0204787 A1 | 8/2013 | Dubois |
| 2013/0204793 A1 | 8/2013 | Kerridge |
| 2013/0204886 A1 | 8/2013 | Faith |
| 2013/0204894 A1 | 8/2013 | Faith |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell |
| 2013/0212666 A1 | 8/2013 | Mattsson |
| 2013/0218640 A1 | 8/2013 | Kidder |
| 2013/0218657 A1 | 8/2013 | Salmon |
| 2013/0218698 A1 | 8/2013 | Moon |
| 2013/0218721 A1 | 8/2013 | Borhan |
| 2013/0218765 A1 | 8/2013 | Hammad |
| 2013/0218769 A1 | 8/2013 | Pourfallah |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246215 A1 | 9/2013 | Faith |
| 2013/0246258 A1 | 9/2013 | Dessert |
| 2013/0246259 A1 | 9/2013 | Dessert |
| 2013/0246261 A1 | 9/2013 | Purves |
| 2013/0246267 A1 | 9/2013 | Tobin |
| 2013/0246342 A1 | 9/2013 | Faith |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0268437 A1 | 10/2013 | Desai |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0290234 A1 | 10/2013 | Harris |
| 2013/0297501 A1 | 11/2013 | Monk |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0325579 A1 | 12/2013 | Salmon |
| 2013/0332344 A1 | 12/2013 | Weber |
| 2013/0339240 A1 | 12/2013 | Anderson |
| 2013/0339253 A1 | 12/2013 | Sincai |
| 2013/0346302 A1 | 12/2013 | Purves |
| 2013/0346305 A1 | 12/2013 | Mendes |
| 2013/0346314 A1 | 12/2013 | Mogollon |
| 2014/0006195 A1 | 1/2014 | Wilson |
| 2014/0006198 A1 | 1/2014 | Daly |
| 2014/0006277 A1 | 1/2014 | Rao |
| 2014/0006283 A1 | 1/2014 | Hogg |
| 2014/0007213 A1 | 1/2014 | Sanin |
| 2014/0013106 A1 | 1/2014 | Path |
| 2014/0013114 A1 | 1/2014 | Path |
| 2014/0013452 A1 | 1/2014 | Aissi |
| 2014/0019352 A1 | 1/2014 | Shrivastava |
| 2014/0020068 A1 | 1/2014 | Desai |
| 2014/0025581 A1 | 1/2014 | Caiman |
| 2014/0025585 A1 | 1/2014 | Caiman |
| 2014/0025958 A1 | 1/2014 | Caiman |
| 2014/0032417 A1 | 1/2014 | Mattsson |
| 2014/0032418 A1 | 1/2014 | Weber |
| 2014/0040001 A1 | 2/2014 | Harvey |
| 2014/0040127 A1 | 2/2014 | Chatterjee |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047517 A1 | 2/2014 | Ding |
| 2014/0047551 A1 | 2/2014 | Nagasundaram |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0095589 A1 | 4/2014 | Johnson |
| 2014/0108172 A1 | 4/2014 | Weber |
| 2014/0108197 A1 | 4/2014 | Smith |
| 2014/0114857 A1 | 4/2014 | Griggs |
| 2014/0136945 A1 | 5/2014 | Ligman |
| 2014/0143137 A1 | 5/2014 | Carlson |
| 2014/0164176 A1 | 6/2014 | Kitlyar |
| 2014/0164243 A1 | 6/2014 | Aabye |
| 2014/0188586 A1 | 7/2014 | Carpenter |
| 2014/0197234 A1 | 7/2014 | Hammad |
| 2014/0294701 A1 | 10/2014 | Dai |
| 2014/0297534 A1 | 10/2014 | Patterson |
| 2014/0310080 A1 | 10/2014 | Salmon |
| 2014/0310183 A1 | 10/2014 | Weber |
| 2014/0330721 A1 | 11/2014 | Wang |
| 2014/0330722 A1 | 11/2014 | Laxminarayanan |
| 2014/0331265 A1 | 11/2014 | Mozell |
| 2014/0337175 A1 | 11/2014 | Katzin |
| 2014/0337236 A1 | 11/2014 | Wong |
| 2014/0344153 A1 | 11/2014 | Raj |
| 2014/0365295 A1 | 12/2014 | Postrel |
| 2014/0372308 A1 | 12/2014 | Sheets |
| 2015/0019443 A1 | 1/2015 | Sheets |
| 2015/0019944 A1 | 1/2015 | Kalgi |
| 2015/0026049 A1 | 1/2015 | Theurer |
| 2015/0032625 A1 | 1/2015 | Dill |
| 2015/0032626 A1 | 1/2015 | Dill |
| 2015/0032627 A1 | 1/2015 | Dill |
| 2015/0039462 A1 | 2/2015 | Shastry |
| 2015/0046241 A1 | 2/2015 | Salmon |

(56) References Cited

U.S. PATENT DOCUMENTS

| | | |
|---|---|---|
| 2015/0046338 A1 | 2/2015 | Laxminarayanan |
| 2015/0046339 A1 | 2/2015 | Wong |
| 2015/0052064 A1 | 2/2015 | Karpenko |
| 2015/0058162 A1 | 2/2015 | Purves |
| 2015/0088756 A1 | 3/2015 | Makhotin |
| 2015/0089350 A1 | 3/2015 | Davis |
| 2015/0106239 A1 | 4/2015 | Gaddam |
| 2015/0112870 A1 | 4/2015 | Nagasundaram |
| 2015/0112871 A1 | 4/2015 | Kumnick |
| 2015/0120472 A1 | 4/2015 | Aabye |
| 2015/0127529 A1 | 5/2015 | Makhotin |
| 2015/0127547 A1 | 5/2015 | Powell |
| 2015/0140960 A1 | 5/2015 | Powell |
| 2015/0142673 A1 | 5/2015 | Nelsen |
| 2015/0154588 A1 | 6/2015 | Purves |
| 2015/0161597 A1 | 6/2015 | Subramanian |
| 2015/0178724 A1 | 6/2015 | Ngo |
| 2015/0180836 A1 | 6/2015 | Wong |
| 2015/0186864 A1 | 7/2015 | Jones |
| 2015/0193222 A1 | 7/2015 | Pirzadeh |
| 2015/0195133 A1 | 7/2015 | Sheets |
| 2015/0199679 A1 | 7/2015 | Palanisamy |
| 2015/0199689 A1 | 7/2015 | Kumnick |
| 2015/0220917 A1 | 8/2015 | Aabye |
| 2015/0248664 A1 | 9/2015 | Makhdumi |
| 2015/0269566 A1 | 9/2015 | Gaddam |
| 2015/0302453 A1 | 10/2015 | Tietzen |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339767 A1 | 11/2015 | Chen |
| 2015/0356560 A1 | 12/2015 | Shastry |
| 2016/0028550 A1 | 1/2016 | Gaddam |
| 2016/0042263 A1 | 2/2016 | Gaddam |
| 2016/0063486 A1 | 3/2016 | Purves |
| 2016/0065370 A1 | 3/2016 | Le Saint |
| 2016/0092696 A1 | 3/2016 | Guglani |
| 2016/0092872 A1 | 3/2016 | Prakash |
| 2016/0103675 A1 | 4/2016 | Aabye |
| 2016/0119296 A1 | 4/2016 | Laxminarayanan |
| 2016/0224976 A1 | 8/2016 | Basu |
| 2016/0283941 A1 | 9/2016 | Andrade |
| 2016/0291920 A1 | 10/2016 | Sirpal |
| 2016/0379192 A1 | 12/2016 | Purves |
| 2017/0046696 A1 | 2/2017 | Powell |
| 2017/0103387 A1 | 4/2017 | Weber |
| 2017/0134479 A1 | 5/2017 | Kalgi |
| 2017/0220818 A1 | 8/2017 | Nagasundaram |
| 2017/0228723 A1 | 8/2017 | Taylor |
| 2017/0235786 A9 | 8/2017 | Faith |
| 2017/0235848 A1 | 8/2017 | Van Dusen |
| 2017/0243199 A1 | 8/2017 | Kalgi |
| 2017/0300314 A1 | 10/2017 | Lopyrev |
| 2017/0346876 A1 | 11/2017 | Lim |
| 2017/0372301 A1 | 12/2017 | Theurer |
| 2018/0046623 A1 | 2/2018 | Faith |
| 2018/0075081 A1 | 3/2018 | Chipman |
| 2018/0108008 A1 | 4/2018 | Chumbley |
| 2018/0189756 A1 | 7/2018 | Purves |
| 2018/0341650 A1 | 11/2018 | Faith |
| 2019/0026729 A1 | 1/2019 | Kalgi |
| 2019/0034921 A1 | 1/2019 | Hammad |
| 2019/0075156 A1 | 3/2019 | Kalgi |
| 2019/0147523 A1 | 5/2019 | Shastry |
| 2019/0188691 A1 | 6/2019 | Purves |
| 2019/0188719 A1 | 6/2019 | Das |
| 2019/0205288 A1 | 7/2019 | Faith |
| 2019/0244192 A1 | 8/2019 | Edward |
| 2019/0266604 A1 | 8/2019 | Desai |
| 2019/0295054 A1 | 9/2019 | Purves |
| 2019/0361845 A1 | 11/2019 | Faith |
| 2019/0385146 A1 | 12/2019 | Priest |
| 2020/0013051 A1 | 1/2020 | Kadiwala |
| 2021/0042726 A1 | 2/2021 | Purves |
| 2021/0084024 A1 | 3/2021 | Sadayoshi |
| 2021/0272101 A1 | 9/2021 | Kalgi |
| 2022/0253832 A1 | 8/2022 | Hammad |
| 2023/0044764 A1 | 2/2023 | Purves |

FOREIGN PATENT DOCUMENTS

| | | |
|---|---|---|
| CN | 1928907 A | 3/2007 |
| CN | 1959727 A | 5/2007 |
| CN | 101025806 A | 8/2007 |
| CN | 101075316 A | 11/2007 |
| CN | 101231727 A | 7/2008 |
| CN | 101334876 A | 12/2008 |
| CN | 101388125 A | 3/2009 |
| CN | 101710407 A | 5/2010 |
| CN | 101719255 A | 6/2010 |
| CN | 101840550 A | 9/2010 |
| CN | 101924690 A | 12/2010 |
| CN | 101945127 A | 1/2011 |
| CN | 101958025 A | 1/2011 |
| CN | 102143290 A | 8/2011 |
| CN | 102779304 | 11/2012 |
| CN | 102947847 | 2/2013 |
| CN | 103635920 | 3/2014 |
| CN | 105027153 | 11/2015 |
| EP | 0745961 A2 | 12/1996 |
| EP | 0855659 A1 | 7/1998 |
| EP | 1921578 A1 | 5/2008 |
| EP | 2156397 A1 | 2/2010 |
| EP | 2503496 | 9/2012 |
| JP | 2001344544 A | 12/2001 |
| JP | 2005004621 A | 1/2005 |
| JP | 2007328549 | 12/2007 |
| JP | 2008527495 A | 7/2008 |
| JP | 2008545210 A | 12/2008 |
| JP | 2009151730 A | 7/2009 |
| JP | 2009176259 | 8/2009 |
| JP | 2011186660 A | 9/2011 |
| JP | 2012027824 A | 2/2012 |
| KR | 20000058839 A | 10/2000 |
| KR | 20010055426 | 7/2001 |
| KR | 20030065920 A | 5/2004 |
| KR | 20060117177 A | 11/2006 |
| KR | 20070104087 A | 10/2007 |
| SG | 2013069539 | 10/2013 |
| WO | 2000046769 A1 | 8/2000 |
| WO | 2001035304 A1 | 5/2001 |
| WO | 0165502 A2 | 9/2001 |
| WO | 2003001866 A1 | 1/2003 |
| WO | 03023674 A1 | 3/2003 |
| WO | 2003046697 A2 | 6/2003 |
| WO | 2003071386 A2 | 8/2003 |
| WO | 2003083737 A1 | 10/2003 |
| WO | 2004042536 A2 | 5/2004 |
| WO | 2005079254 A2 | 9/2005 |
| WO | 2006113834 A2 | 10/2006 |
| WO | 2009032523 A1 | 3/2009 |
| WO | 2010078522 A1 | 7/2010 |
| WO | 2010148704 A1 | 12/2010 |
| WO | 2010148737 A1 | 12/2010 |
| WO | 2012068078 A2 | 5/2012 |
| WO | 2012098556 A1 | 7/2012 |
| WO | 2012112822 A2 | 8/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 201505136 | 1/2015 |

OTHER PUBLICATIONS

Australian Examination Report for AU2017203295 dated Apr. 19, 2018, 4 pages.

Australian Patent Office, Patent Examination Report No. 2 in Australian Patent Application No. 2012217606, dated Jun. 15, 2016, 6 pages.

(56) References Cited

OTHER PUBLICATIONS

Brick-and-mortar retailers snatching customers away from E-tailers. (Feb. 16, 2012). PR Newswire Retrieved from https://dialog.proguest.corn/professional/docview/1346330115?accountid=142257 (Year: 2012) 3 pages.

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Chandra, Shalini; Srivastava, Shirish C.; and Theng, Yin-Leng (2010) "Evaluating the Role of Trust in Consumer Adoption of Mobile Payment Systems: An Empirical Analysis," Communications of the Association for Information Systems: vol. 27, Article 29. http://aisel.aisnet.org/cais/vol27/iss1/29 (Year: 2010) 30 pages.

Charland et al., Mobile Application Development: Web vs. Native, Apr. 2011, 9 pages.

Chinese Office Action (including English translation) for Application No. CN201710037081.6, dated Feb. 5, 2021, 7 pages.

Chinese Office Action (with English language translation) dated Jan. 30, 2019 for Application No. 201280019629.X, 10 pages.

Chinese Office Action (with English language translation) dated Nov. 6, 2017 for CN Application No. 201280018719.7, 24 pages.

Chinese Office Action (with English language translation) for Application No. 201480023694.9 dated Dec. 3, 2018, 17 pages.

Chinese Office Action (with English language translation) for Application No. 201480023694.9, dated Jun. 26, 2019, 7 pages.

Chinese Office Action (with English language translation) for Application No. CN201480023694.9, dated Jan. 21, 2020, 12 pages.

Chinese Office Action (with English language translation) for Application No. CN201710037081.6, dated Mar. 17, 2020, 23 pages.

Chinese Office Action (with English language translation) for Application No. CN201710037081.6, dated Oct. 21, 2020, 11 pages.

Chinese Office Action dated Oct. 10, 2017 for CN Application No. 201280019629.X, 7 pages.

Chipman, et al., U.S. Appl. No. 15/265,282 (Unpublished), Self-Cleaning Token Vault, filed Sep. 14, 2016. 47 pages.

Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.

David Breitkopf, "ACS to Take Over Mich. WC Distribution Program", American Banker, New York, NY: Jul. 20, 2006, vol. 171. Issue 138, p. 6.

Dimmick, U.S. Appl. No. 14/952,444 (unpublished), Tokenization Request Via Access Device, filed Nov. 25, 2015, 78 pages.

Dimmick, U.S. Appl. No. 14/952,514 (unpublished), Systems Communications With Non-Sensitive Identifiers, filed Nov. 25, 2015, 72 pages.

Dizaj, Mohammad Vahid Alizadeh, Moghaddam, Rexa Askari, Momenebellah, Samad, New Mobile Payment Protocol: Mobile Pay Center Protocol 2 (MPCP2) By Using New Key Agreement Protocol: VAM, 3d International Conference on Electronics Computer Technology, vol. 2, Apr. 2011, pp. 12-18.

European Patent Office, Supplementary European Search Report and European Search Opinion, in EP Application No. 12749451.6, dated Apr. 20, 2015, 7 pages.

Ex Parte Quayle Action dated Jan. 18, 2019 for U.S. Appl. No. 16/182,288 (pp. 1-5).

Flurscheim et al., U.S. Appl. No. 62/108,403 (unpublished), Wearables With NFC HCE filed Jan. 27, 2015.

Gaddam et al., U.S. Appl. No. 62/053,736 (unpublished), Completing Transactions Without a User Payment Device, filed Sep. 22, 2014.

Galland et al., U.S. Appl. No. 62/128,709 (unpublished), Tokenizing Transaction Amounts, filed Mar. 5, 2015.

Gao et al., "A2D Barcode-Based Mobile Payment System", (2009), XP031561633 (10 pages).

Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.

Gopalan, NP & Selvan, B Siva. TCP/IP Illustrated. Prentice-Hall. 2008. pp. 101-102, 175-176 and 235. 7 pages.

Hoverson et al., U.S. Appl. No. 62/038,174 (unpublished), Customized Payment Gateway, filed Aug. 15, 2014.

I. Malavolta, Web-based hybrid mobile apps: state of the practice and research opportunities, 2 pages (Year: 2016).

Immaneni et al., Hybrid retrieval from the unified web, Mar. 2007, 5 pages.

Indian Examination Report for Application No. 8894/DELNP/2015, dated Oct. 21, 2019, 7 pages.

International Preliminary Report on Patentability dated Jan. 14, 2014 cited in related/corresponding International PCT Appl. No. PCT/US2012/045875 filed Jul. 7, 2012. (11 pages).

International Preliminary Report on Patentability dated Jan. 16, 2014 in related/corresponding PCT Patent Appl. No. PCT/US2012/045601 filed Jul. 5, 2012. (7 pages).

International Search Report and Written Opinion for PCT/US09/54921 dated Oct. 21, 2009. (8 pages).

International Search Report and Written Opinion for PCT/US2010/033229 dated Dec. 29, 2010. (8 pages).

International Search Report and Written Opinion for PCT/US11/57173 dated Mar. 15, 2012. (11 pages).

International Search Report and Written Opinion for PCT/US11/57179 dated Jan. 5, 2012. (7 pages).

International Search Report and Written Opinion for PCT/US11/57180 dated Mar. 15, 2012 (11 pages).

International Search Report and Written Opinion for PCT/US12/37597 dated Sep. 21, 2012 (11 pages).

International Search Report and Written Opinion for PCT/US12/41437 dated Aug. 24, 2012. (20 pages).

International Search Report and Written Opinion for PCT/US12/47092 dated Nov. 26, 2012. 11 pages.

International Search Report and Written Opinion for PCT/US12/55636 dated Nov. 30, 2012. 9 pages.

International Search Report and Written Opinion for PCT/US12/56759 dated Feb. 25, 2013. 12 pages.

International Search Report and Written Opinion for PCT/US12/57528 dated Dec. 17, 2012. 8 pages.

International Search Report and Written Opinion for PCT/US12/65738 dated Apr. 19, 2013. 9 pages.

International Search Report and Written Opinion for PCT/US12/66898 dated Feb. 11, 2013. 14 pages.

International Search Report and Written Opinion for PCT/US13/46875, dated Oct. 24, 2013, 14 pages.

International Search Report and Written Opinion for PCT/US2010/033861 dated Dec. 9, 2010 (7 pages).

International Search Report and Written Opinion for PCT/US2010/041860 dated Feb. 1, 2011. (8 pages).

International Search Report and Written Opinion for PCT/US2010/046833 dated Apr. 26, 2011 (8 pages).

International Search Report and Written Opinion for PCT/US2010/048344 dated Nov. 15, 2010. (7 pages).

International Search Report and Written Opinion for PCT/US2011/024941 dated Apr. 19, 2011 (6 pages).

International Search Report and Written Opinion for PCT/US2011/032093 dated Aug. 24, 2011 (11 pages).

International Search Report and Written Opinion for PCT/US2011/26734 dated Apr. 29, 2011 (7 pages).

International Search Report and Written Opinion for PCT/US2011/29790 dated May 19, 2011 (6 pages).

International Search Report and Written Opinion for PCT/US2012/026205, dated May 29, 2012. 12 pages.

International Search Report and Written Opinion for PCT/US2012/027043 dated Jul. 13, 2012. 15 pages.

International Search Report and Written Opinion for PCT/US2012/045601 dated Feb. 1, 2013. 11 pages.

International Search Report and Written Opinion for PCT/US2012/057528, dated May 29, 2012. (8 pages).

(56) References Cited

OTHER PUBLICATIONS

International Search Report and Written Opinion for PCT/US2012/069557 dated Feb. 22, 2013. 8 pages.
International Search Report and Written Opinion for PCT/US2013/020411 dated May 21, 2013. 18 pages.
International Search Report and Written Opinion for PCT/US2013/024538, dated May 31, 2013. 15 pages.
International Search Report and Written Opinion for PCT/US2013/031084, dated Jun. 4, 2013. 9 pages.
International Search Report and Written Opinion for PCT/US2014/030517, dated Aug. 18, 2014. (9 pages).
International Search Report and Written Opinion issued in connection with PCT/US11/42062 dated Sep. 29, 2011 (8 pages).
International Search Report and Writttten Opinion for PCT/US2011/039178 dated Sep. 16, 2011 (7 pages).
International Search Report for PCT/US11/49393 dated Dec. 5, 2011. (2 pages).
International Search Report for PCT/US11/65305 dated Apr. 16, 2012. 2 pages.
International Search Report for PCT/US12/21000 dated May 15, 2012. 2 pages.
International Search Report for PCT/US12/23856 dated Jun. 6, 2012. 3 pages.
International Search Report for PCT/US12/24772 dated Jul. 24, 2012. 3 pages.
International Search Report for PCT/US12/25530 dated Aug. 7, 2012. 4 pages.
International Search Report for PCT/US12/39638 dated Sep. 24, 2012. 4 pages.
International Search Report for PCT/US12/45875 dated Nov. 16, 2012. 4 pages.
International Search Report for PCT/US12/57577 dated Nov. 29, 2012. 2 pages.
International Search Report for PCT/US2010/033229 dated Dec. 29, 2010, 3 pages.
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report for PCT/US2011/035268 dated Aug. 5, 2011 (3 pages).
International Search Report PCT/US12/27620 dated Aug. 10, 2012. 3 pages.
IP Australia, Patent Examination Report No. 1, Australian Application No. 2012220669, dated Sep. 8, 2014, 6 pages.
IP Australia, Patent Examination Report No. 2, Australian Application No. 2012220669, dated Jun. 8, 2016, 4 pages.
Jiang Hao, "Research on the discovery mechanism of relay node in the middle of the peer network", the full-text database of excellent Master's degree thesis in China, (May 15, 2009).
Kalgi et al., U.S. Appl. No. 62/024,426 (unpublished), Secure Transactions Using Mobile Devices, filed Jul. 14, 2014.
Kinagi, U.S. Appl. No. 62/117,291 (unpublished), Token and Cryptogram Using Transaction Specific Information filed Feb. 17, 2015.
Le Saint et al., U.S. Appl. No. 15/008,388 (unpublished), Methods for Secure Credential Provisioning, filed Jan. 27, 2016. 89 pages.
Lee et al., osgGap: scene graph library for mobile based on hybrid web app framework, Nov. 2013, 4 pages.
Li, U.S. Appl. No. 61/894,749 (unpublished), Methods and Systems for Authentication and Issuance of Tokens in a Secure Environment filed Oct. 23, 2013.
Liang, J., Shi, R., Liang, F, & Gao, Z. H. (2001). WAP clients & SET protocol. Dr.Dobb's Journal, 26(6), 85-91. Retrieved from http://dialog.proquest.conn/professional/docview/202692023?accountid=131444 (Year: 2001) (5 pages).

Lowry P B XML data mediation and collaboration: a proposed comprehensive architecture and query requirements for using XML to mediate heterogeneous data sources and targets, Proceedings of the 34th Hawaii International Conference on System Sciences—2001, Jan. 1, 2003; Jan. 3, 2001-Jan. 6, 2001, IEEE, pp. 1-9.
McCarney et al., "Tapas: Design, Implementation, and Usability Evaluation of a Password Manager," Copyright 2012, ACM 978 1-4503-1312-4/12/12 (10 pages).
McGuire, U.S. Appl. No. 14/600,523 (unpublished), Secure Payment Processing Usnig Authorization Request, filed Jan. 20, 2015. 42 pages.
Notice of Allowance dated Oct. 10, 2018 for U.S. Appl. No. 14/242,403 (pp. 1-11).
Notice of Allowance dated Apr. 12, 2019 for U.S. Appl. No. 16/182,288 (pp. 1-8).
Notice of Allowance dated Feb. 10, 2021 for U.S. Appl. No. 15/627,085 (pp. 1-15).
Notice of Allowance dated Feb. 27, 2019 for U.S. Appl. No. 15/839,493 (pp. 1-9).
Notice of Allowance dated Jan. 14, 2021 for U.S. Appl. No. 16/140,879 (pp. 1-9).
Notice of Allowance dated Jan. 19, 2021 for U.S. Appl. No. 16/283,251 (pp. 1-5).
Notice of Allowance dated Jan. 22, 2021 for U.S. Appl. No. 16/532,095 (pp. 1-10).
Notice of Allowance dated Jan. 27, 2021 for U.S. Appl. No. 16/273,976 (pp. 1-9).
Notice of Allowance dated Jan. 29, 2021 for U.S. Appl. No. 15/988,485 (pp. 1-7).
Notice of Allowance dated Jul. 23, 2018 for U.S. Appl. No. 15/406,325 (pp. 1-9).
Notice of Allowance dated Jun. 10, 2020 for U.S. Appl. No. 15/494,294 (pp. 1-10).
Notice of Allowance dated Jun. 15, 2020 for U.S. Appl. No. 16/440,486 (pp. 1-8).
Notice of Allowance dated Jun. 27, 2018 for U.S. Appl. No. 13/542,443 (pp. 1-13).
Notice of Allowance dated Mar. 31, 2021 for U.S. Appl. No. 16/294,676 (pp. 1-9).
Notice of Allowance dated May 30, 2019 for U.S. Appl. No. 13/758,472 (pp. 1-10).
Notice of Allowance dated Nov. 8, 2019 for U.S. Appl. No. 14/698,317 (pp. 1-10).
Notice of Allowance dated Nov. 30, 2018 for U.S. Appl. No. 15/717,409 (pp. 1-8).
Notice of Allowance dated Oct. 11, 2018 for U.S. Appl. No. 13/520,481 (pp. 1-9).
Office Action dated Feb. 28, 2018 fo U.S. Appl. No. 14/242,403 (pp. 1-11).
Office Action dated Apr. 1, 2020 for U.S. Appl. No. 16/140,879 (pp. 1-17).
Office Action dated Apr. 12, 2018 for U.S. Appl. No. 13/520,481 (pp. 1-8).
Office Action dated Aug. 21, 2020 for U.S. Appl. No. 15/988,485 (pp. 1-10).
Office Action dated Dec. 12, 2019 for U.S. Appl. No. 14/935,122 (pp. 1-12).
Office Action dated Dec. 27, 2018 for U.S. Appl. No. 13/398,817 (pp. 1-10).
Office Action dated Dec. 3, 2018 for U.S. Appl. No. 14/935,122 (pp. 1-13).
Office Action dated Dec. 4, 2020 for U.S. Appl. No. 16/017,241 (pp. 1-10).
Office Action dated Feb. 4, 2020 for U.S. Appl. No. 13/629,006 (pp. 1-7).
Office Action dated Jan. 17, 2019 for U.S. Appl. No. 14/216,382 (pp. 1-7).
Office Action dated Jan. 7, 2021 for U.S. Appl. No. 16/245,777 (pp. 1-10).
Office Action dated Jul. 10, 2019 for U.S. Appl. No. 13/398,817 (pp. 1-8).
Office Action dated Jul. 10, 2020 for U.S. Appl. No. 16/017,241 (pp. 1-9).

(56) References Cited

OTHER PUBLICATIONS

Office Action dated Jul. 16, 2018 for U.S. Appl. No. 14/698,317 (pp. 1-13).
Office Action dated Jun. 21, 2018 for U.S. Appl. No. 14/216,351 (pp. 1-12).
Office Action dated Jun. 22, 2018 for U.S. Appl. No. 13/629,006 (pp. 1-8).
Office Action dated Jun. 27, 2018 for U.S. Appl. No. 15/717,409 (pp. 1-7).
Office Action dated Jun. 27, 2019 for U.S. Appl. No. 13/629,006 (pp. 1-7).
Office Action dated Mar. 1, 2019 for U.S. Appl. No. 14/698,317 (pp. 1-11).
Office Action dated Mar. 13, 2020 for U.S. Appl. No. 15/494,294 (pp. 1-8).
Office Action dated Mar. 6, 2020 for U.S. Appl. No. 16/017,241 (pp. 1-7).
Office Action dated Mar. 6, 2020 for U.S. Appl. No. 16/440,486 (pp. 1-8).
Office Action dated May 14, 2019 for U.S. Appl. No. 14/935,122 (pp. 1-11).
Office Action dated May 19, 2020 for U.S. Appl. No. 15/627,085 (pp. 1-11).
Office Action dated May 22, 2018 for U.S. Appl. No. 14/216,382 (pp. 1-8).
Office Action dated May 25, 2021 for U.S. Appl. No. 16/017,241 (pp. 1-13).
Office Action dated Nov. 12, 2020 for U.S. Appl. No. 16/273,976 (pp. 1-9).
Office Action dated Nov. 2, 2018 for U.S. Appl. No. 13/624,779 (pp. 1-18).
Office Action dated Oct. 22, 2020 for U.S. Appl. No. 14/244,488 (pp. 1-13).
Office Action dated Oct. 27, 2020 for U.S. Appl. No. 16/294,676 (pp. 1-9).
Office Action dated Oct. 29, 2019 for U.S. Appl. No. 14/216,382 (pp. 1-8).
Office Action dated Oct. 31, 2019 for U.S. Appl. No. 15/627,085 (pp. 1-9).
Office Action dated Oct. 4, 2018 for U.S. Appl. No. 13/758,472 (pp. 1-22).
Office Action dated Oct. 6, 2020 for U.S. Appl. No. 16/532,095 (pp. 1-13).
Office Action dated Oct. 9, 2020 for U.S. Appl. No. 16/283,251 (pp. 1-6).
Office Action dated Sep. 21, 2018 for U.S. Appl. No. 15/839,493 (pp. 1-21).
Office Action dated Sep. 4, 2020 for U.S. Appl. No. 15/627,085 (pp. 1-10).
Pan Kexian "Development of the Location-Based Service LBS Application of Intelligent Mobile Phone", Information Technologies, Oct. 25, 2009, pp. 134-137, cited on Oct. 10, 2017 in CN201280019629.
Patterson, U.S. Appl. No. 15/019,157 (unpublished), Token Processing Utilizing Multiple Authorizations, filed Feb. 9, 2016. 62 pages.
Patterson, U.S. Appl. No. 62/054,346 (unpublished), Mirrored Token Vault, filed Sep. 23, 2014.
Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.
Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.

Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Prakash et al., U.S. Appl. No. 14/955,716 (unpublished), Provisioning Platform for Machine-To-Machine Devices, filed Dec. 1, 2015. 72 pages.
Prakash et al., U.S. Appl. No. 62/037,033 (unpublished), Sharing Payment Token, filed Aug. 13, 2014.
Rangarajan et al., U.S. Appl. No. 61/751,763 (unpublished), Payments Bridge filed Jan. 11, 2013.
Ratha, N., and Bolle, R., 1. History of Fingerprint Pattern Recognition-1.1 Introduction; 1.2 The Development of Fingerprint Classification Systems "Automatic Fingerprint Recognition Systems," Springer-Verlag, (2004) (466 pages).
Sabba et al., U.S. Appl. No. 15/011,366 (unpublished), Token Check Offline, filed Jan. 29, 2016. 60 pages.
Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.
Sharma et al., U.S. Appl. No. 62/003,717 (unpublished), Mobile Merchant Application filed May 28, 2014.
ShopSawy Blog. Feb. 2012. Retrieved from https://web.archive.Org/web/20120212104611/http://shopsavvy.com/blog. pp. 1-13 (Year: 2012).
Smartphone e-payment and Google AD send blog, 'Google Wallet on Smartphone', <http://stockpedia.blogspot.kr/2011/06/google-wallet.html> Jun. 10, 2011, pp. 1-3.
Stack Exchange, Why aren't there automated translators from one programming language to another, 2010 (5 pages).
State Intellectual Property of the People's Republic of China, First Office Action in Chinese Application No. 201280019629.X, dated Aug. 1, 2016, 15 pages.
State Intellectual Property Office of the People's Republic of China, First Office Action in Chinese Application No. 201280018719.7, dated Jul. 4, 2016, 31 pages.
Stubbs et al., U.S. Appl. No. 62/103,522 (unpublished), Methods and Systems for Wallet Provider Provisioning filed Jan. 14, 2015.
U.S. Appl. No. 15/462,658 (Unpublished), Replacing Token on a Multi-Token User Device, filed Mar. 17, 2017. 53 pages.
U.S. Appl. No. 12/940,664 (unpublished), entitled "System and Method for Determining Transaction Distance" filed Nov. 5, 2010. (51 pages).
U.S. Appl. No. 61/250,440, filed Oct. 9, 2009, entitled "Systems and Methods to Provide Loyalty Programs". 164 pages.
Vitt, Elizabeth et al. Data Integration Solutions for Master Data Management (Feb. 2006). https://technet.microsoft.com/en-us/library/aa964123(v=sql.90).aspx (19 pages).
Vitt, Elizabeth, et al. "Microsoft SQL Server 2005 Analysis Services Performance Guide." White Paper, White Paper (2007). (116 pages).
Wang Lepeng et al. "Discuss of Foursquare Pattern and Its Deelopment Strategies in China" Scientific and Technological Information, Aug. 15, 2010, pp. 90-91, cited on Oct. 10, 2017 in CN201280019629.
Wang, U.S. Appl. No. 62/000,288 (unpublished), Payment System Canonical Address Format, filed May 19, 2014.
Wang, U.S. Appl. No. 62/042,050 (unpublished), Payment Device Authentication and Authorization System, filed Aug. 26, 2014.
Win Anyu, "A cluster based routing relay node selection algorithm", 2010 Asia-Pacific Conference on Information Network and Digital Content Security (2010APCID), (Dec. 31, 2010).
Wong et al., U.S. Appl. No. 14/966,948 (unpublished), Automated Access Data Provisioning filed Dec. 11, 2015. 52 pages.
Wong et al., U.S. Appl. No. 61/879,362 (unpublished), Systems and Methods for Managing Mobile Cardholder Verification Methods filed Sep. 18, 2013.
Written Opinion for PCT/US12/27620 dated Aug. 10, 2012. 5 pages.
Xing Chang-you and Chen Ming; "Network distance prediction technology", Journal of Software , (Sep. 30, 2009), vol. 20, No. 9, p. 2470-2482 http://www.jos.org.cn/josen/ch/reader/view_abstract.aspx?flag=1&file_no=3559&journal_id=jos.
Yang Jingjing "Help Web: Life Search Forerunner" Scientific and Technological Information, Aug. 5, 2010, pp. 36-37, cited on Oct. 10, 2017 in CN201280019629.

(56) References Cited

OTHER PUBLICATIONS

Office Action (Non-Final Rejection) dated Aug. 1, 2022 for U.S. Appl. No. 17/321,773 (pp. 1-25).
Office Action (Notice of Allowance and Fees Due (PTOL-85)) dated Mar. 8, 2022 for U.S. Appl. No. 17/064,832 (pp. 1-8).
Office Action dated Jul. 23, 2021 for U.S. Appl. No. 16/245,777 (pp. 1-12).
Chinese Office Action (including English translation) issued in App. No. CN201810822482.7, dated Mar. 25, 2022, 15 pages.
Office Action (Notice of Allowance and Fees Due (PTOL-85)) dated Apr. 22, 2022 for U.S. Appl. No. 16/245,777 (pp. 1-9).
Office Action (Notice of Allowance and Fees Due (PTOL-85)) dated Apr. 27, 2022 for U.S. Appl. No. 17/064,832 (pp. 1-2).
Dragt, Bruce. "Universal Commerce: A Seamless, Personalized Purchase Experience for Today's Connected Consumers." A First Data White Paper (2012). (Year: 2012) (pp. 1-17).
Office Action (Notice of Allowance and Fees Due (PTOL-85)) dated Jan. 25, 2022 for U.S. Appl. No. 16/245,777 (pp. 1-11).
Supplemental Notice of Allowability dated Dec. 3, 2021 for U.S. Appl. No. 16/017,241 (pp. 1-2).
Notice of Allowance dated Nov. 18, 2021 for U.S. Appl. No. 16/017,241 (pp. 1-9).
Office Action dated Oct. 27, 2021 for U.S. Appl. No. 17/064,832 (pp. 1-20).
Ruiz-Martínez, A., Cánovas, Ó., & Gómez-Skarmeta, A.,F. (2009). Design and implementation of a generic per-fee-link framework. Internet Research, 19(3), 293-312. loi:https://doi.org/10.1108/10662240910965360 (Year: 2009).
A. Ruiz-Martinez, O. Canovas and A. F. Gomez-Skarmeta, "Towards a generic per-fee-link framework," 2007 2nd International Conference on Digital Information Management, 2007, pp. 37-42, doi: 10.1109/ICDIM.2007.4444197. (Year: 2007).
Office Action (Final Rejection) dated Jan. 10, 2023 for U.S. Appl. No. 17/321,773 (pp. 1-27).

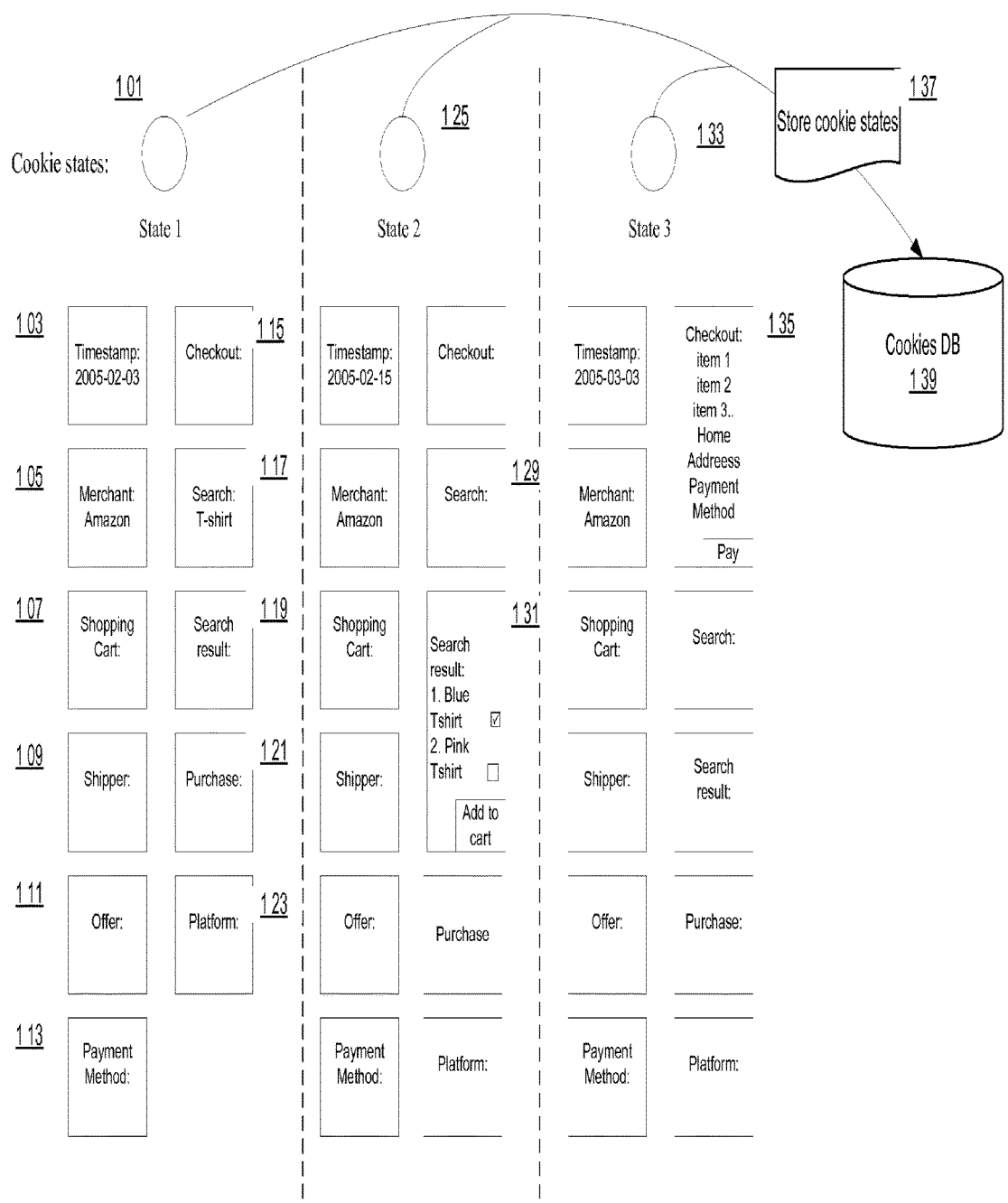
FIGURE 1 — Example Data Flow: Cookie/sSates Storage

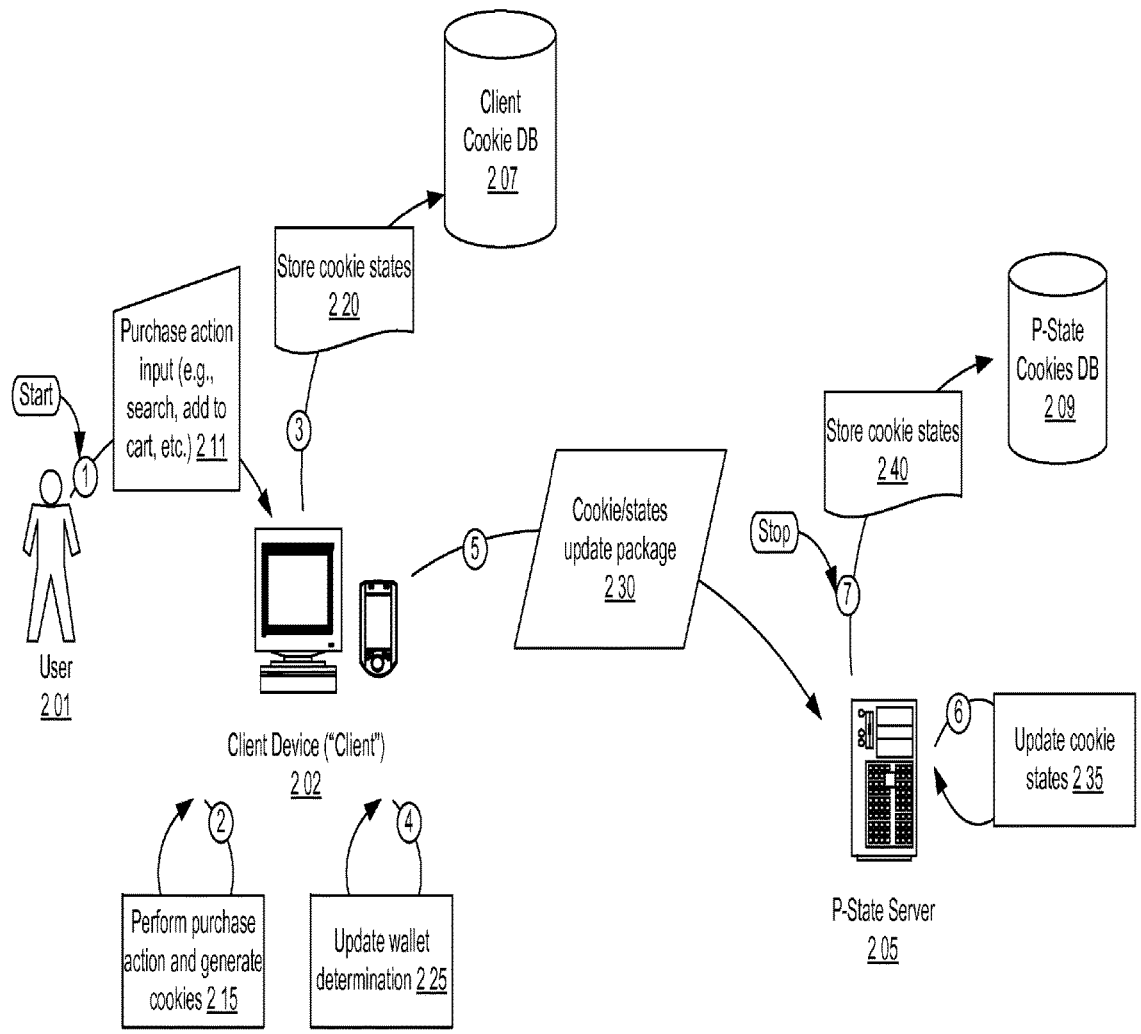
FIGURE 2  Example Data Flow: Cookie/States Storage

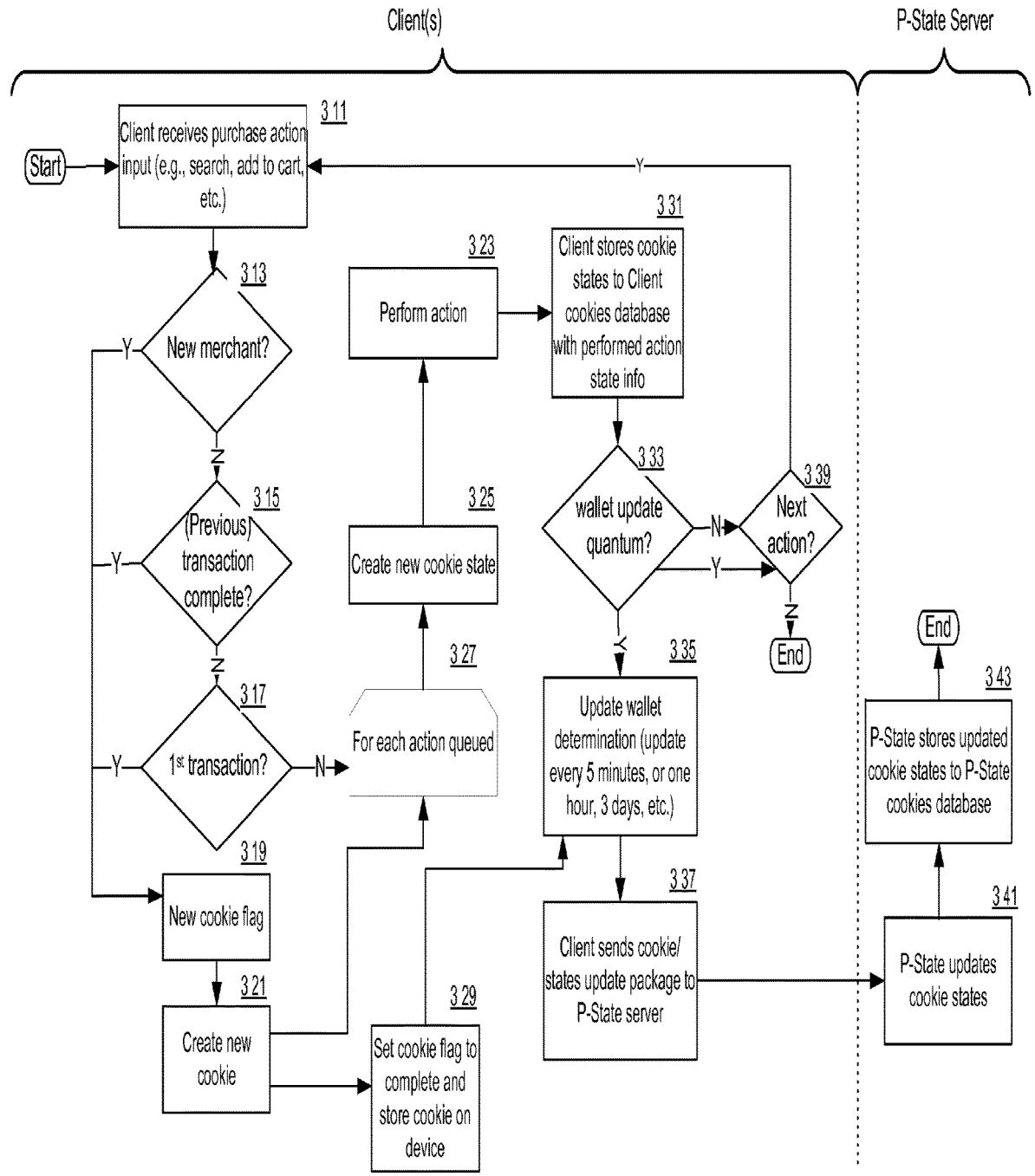
FIGURE 3 — Example Logic Flow: Cookie/States Storage ("CSS") component

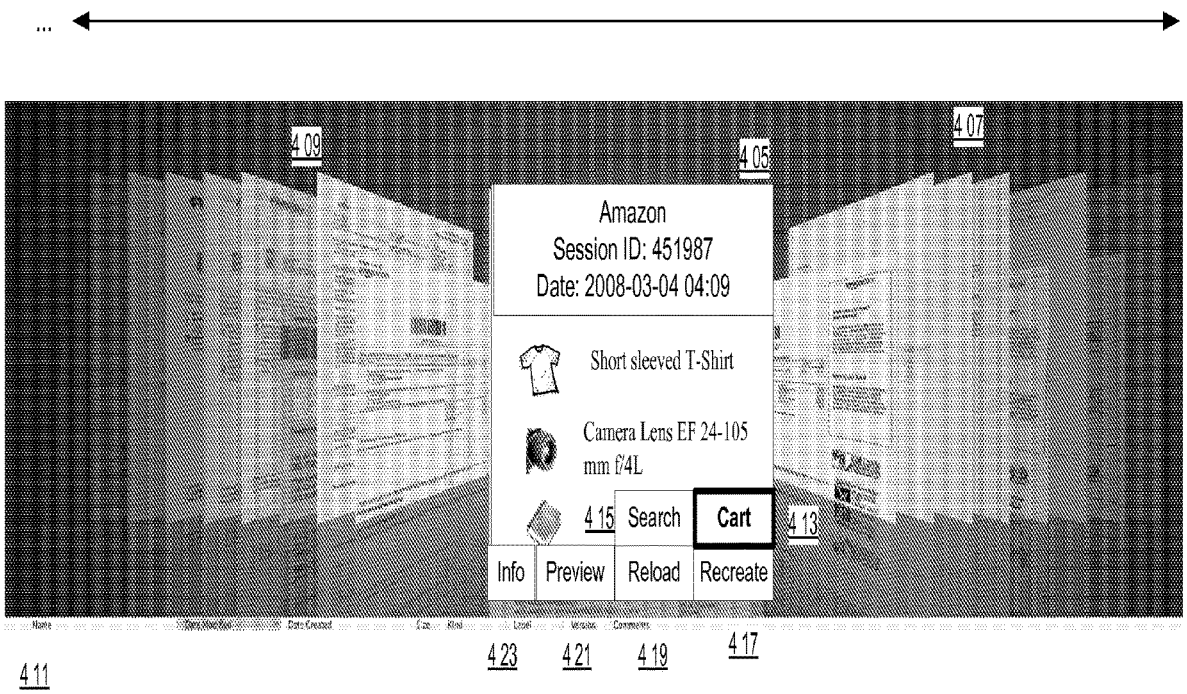
FIGURE 4A  Example User Interface: Cookie States Storage

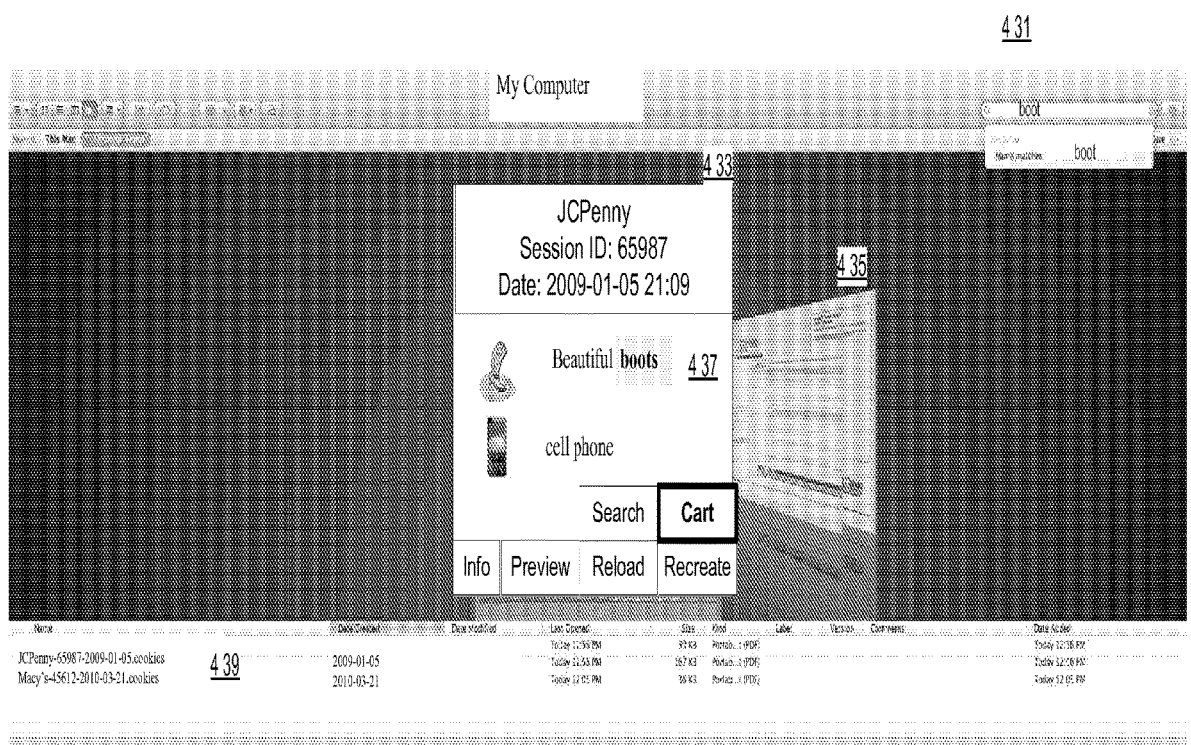
FIGURE 4B                                    Example User Interface: Cookie States Storage

| | | | | | My Account   Sign Out |
|---|---|---|---|---|---|
| | | 4 53 | | | |
| | 4 51 My Wallet Cookies | Search | | | |
| | | Time (Product) Price  Merchant  Platform  ... | | | |
| 4 55 | 4 57 | 4 59 | 4 61 | 4 63 | 4 65 | 4 67 |
| Time | Product | Price | Merchant | Platform | Coupons | Shippers |
| 2010-01-15 12:36:00 | 👕 Short sleeved T-Shirt | $10 | JCPenny | iphone | $5 off | USPS |
| 2009-03-20 10:21:00 | | | | iPad  4 77 | | |
| | 📷 Camera Lens EF 24-105 mm f/4L | $300 | Bestbuy | | | UPS |
| 2009-03-16 16:21:00 | | | | merchant kiosk  4 79 | | |
| 2006-03-20 09:00:00 | 📖 Textbook | $12 | Amazon | web | 10% off | Fedex |

FIGURE 4C                                                         Example User Interface: Cookie States Storage

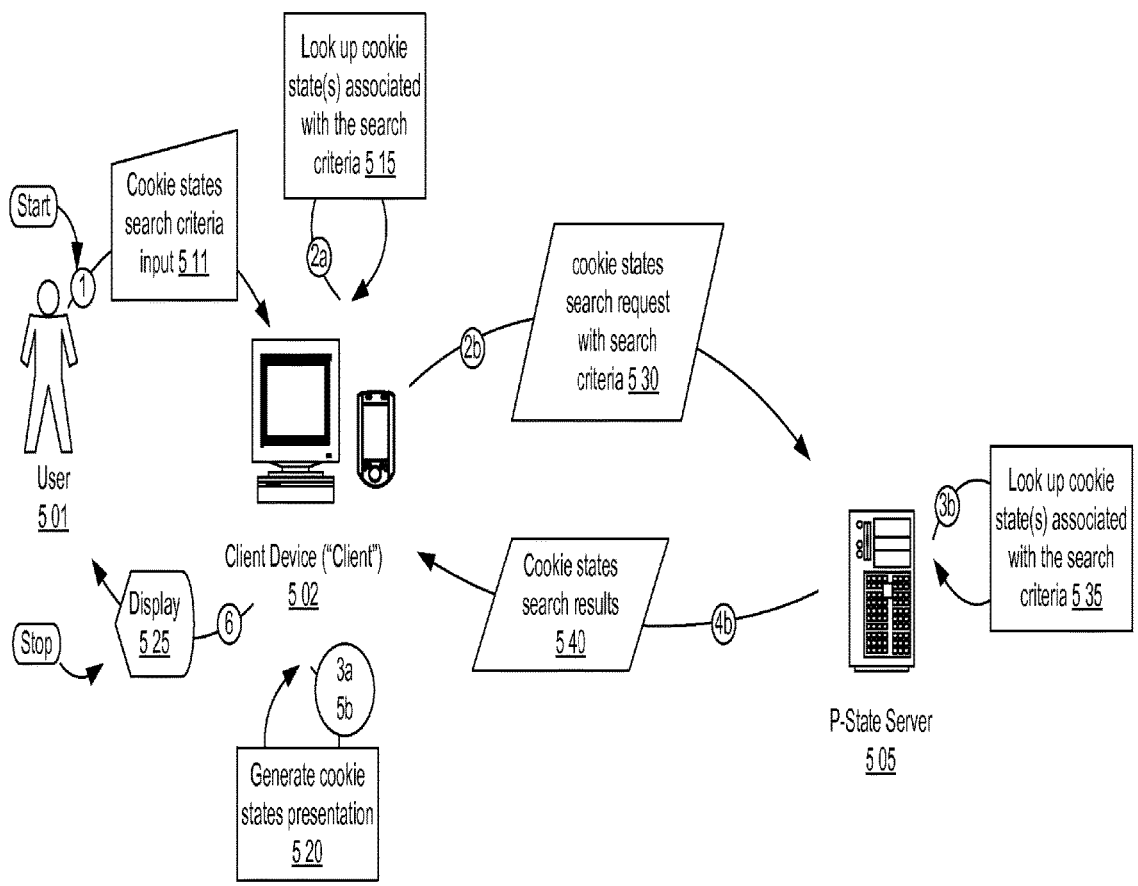
FIGURE 5 — Example Data Flow: Cookie States Search Presentation

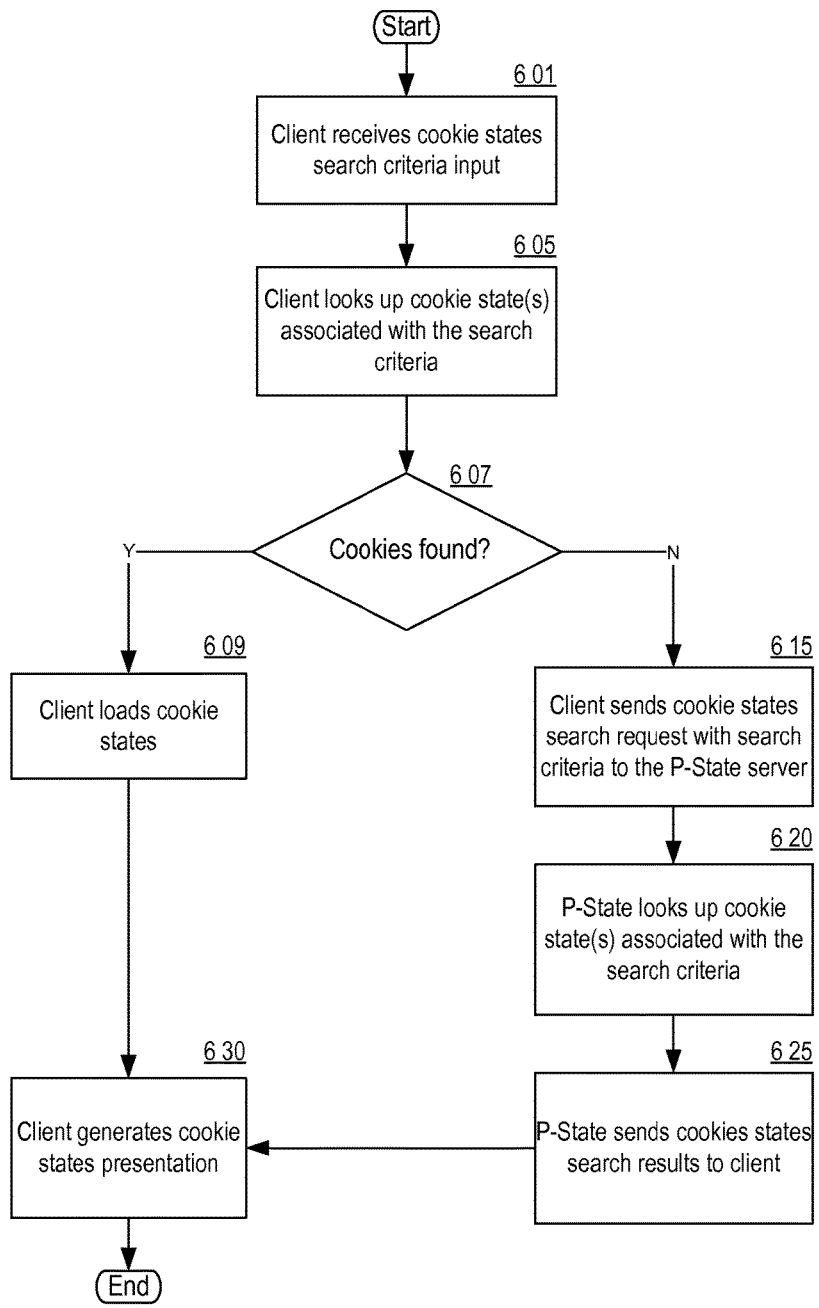
FIGURE 6  Example Logic Flow: Cookie States Search Presentation ("CSSP") component

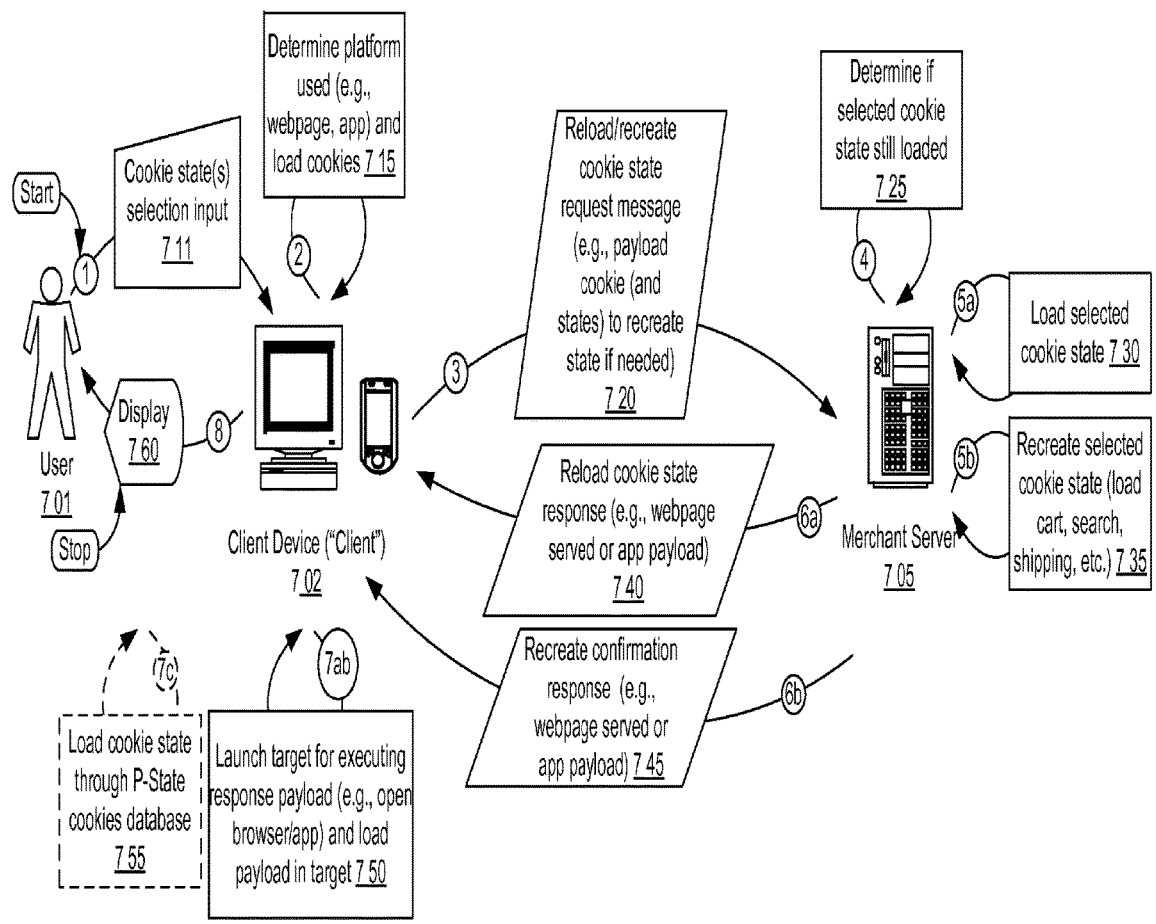
FIGURE 7        Example Data Flow: Cookie/States Reload/Recreate

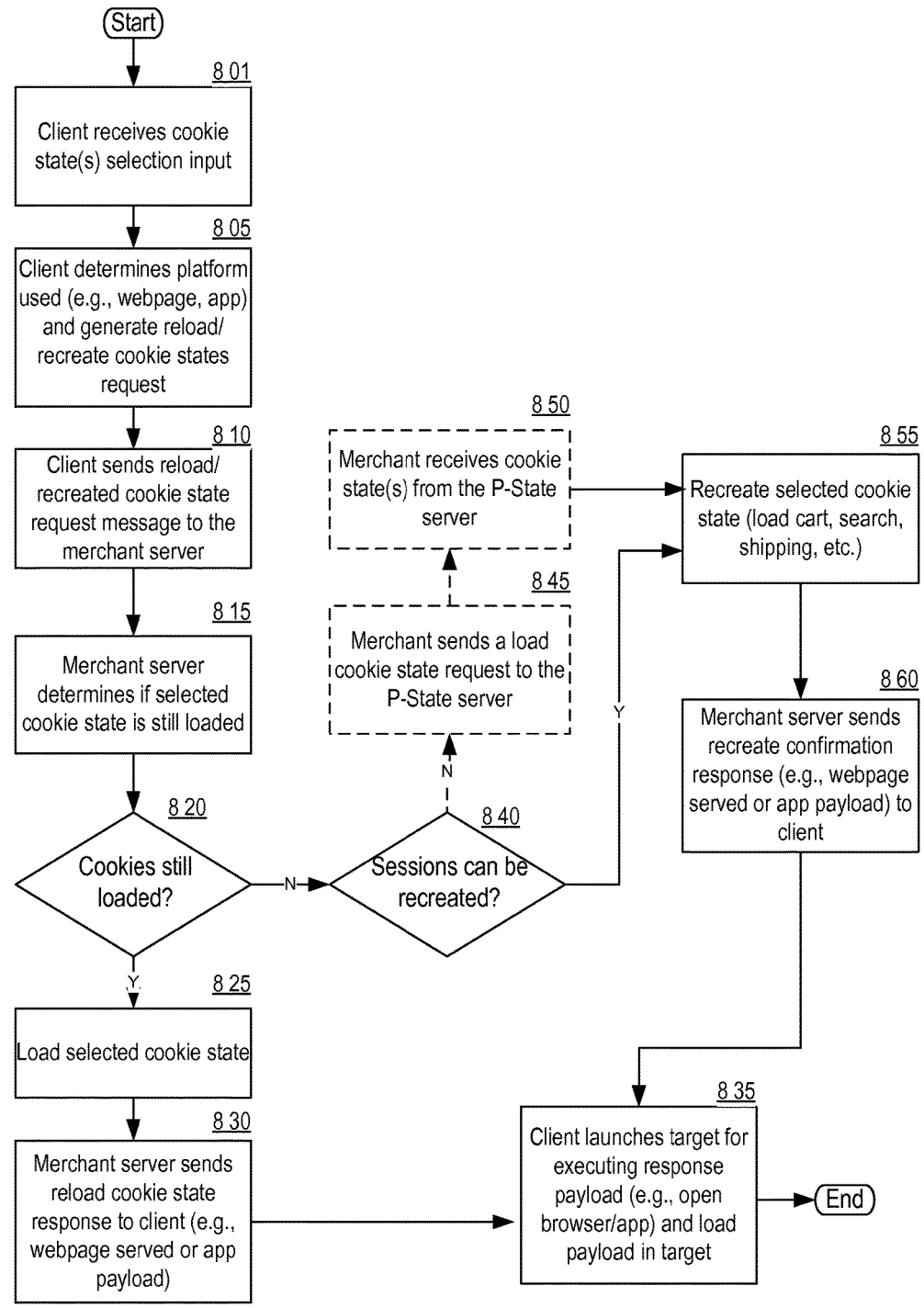
FIGURE 8                Example Logic Flow: Cookie/States Reload/Recreate ("CSRR") component

US 11,763,294 B2

REMOTE DECOUPLED APPLICATION PERSISTENT STATE APPARATUSES, METHODS AND SYSTEMS

This application is a continuation of U.S. patent application Ser. No. 16/283,251, filed Feb. 22, 2019, which is a continuation of U.S. patent application Ser. No. 14/216,351, filed Mar. 17, 2014, now U.S. Pat. No. 10,242,358, which claims priority to U.S. Patent Application Ser. No. 61/798,483, filed Mar. 15, 2013, and is a continuation of U.S. patent application Ser. No. 13/624,779, filed Sep. 21, 2012, which is a continuation-in-part of U.S. patent application Ser. No. 13/589,053, filed Aug. 17, 2012, which claims priority to: U.S. provisional patent application Ser. No. 61/525,168, filed Aug. 18, 2011; U.S. provisional patent application Ser. No. 61/537,421, filed Sep. 21, 2011; and U.S. provisional patent application Ser. No. 61/668,441 filed Jul. 5, 2012. The entire contents of the aforementioned applications are expressly incorporated by reference herein.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to digital wallets and account management, and more particularly, to REMOTE DECOUPLED APPLICATION PERSISTENT STATE APPARATUSES, METHODS AND SYSTEMS.

BACKGROUND

Consumers using the World Wide Web browse product listings of merchants and make purchases on selected products. Electronic data can be stored in computers and other storage devices for future access.

SUMMARY

In accordance with the teachings provided herein, systems, methods, non-transitory computer-readable medium, and apparatuses are disclosed for operation upon data processing devices for processing digital wallet transaction-related persistent states, such as by: receiving, by use of one or more processors, a wallet transaction-related persistent state update request identifying a wallet user, wherein the wallet transaction-related persistent state update request includes wallet persistent state payload; storing, by use of the one or more processors, the wallet persistent state payload associated with the wallet user; receiving, by use of the one or more processors, a wallet persistent state search criteria from the wallet user; providing, by use of the one or more processors, the wallet persistent state search results to the wallet user; receiving, by use of the one or more processors, a wallet persistent state selection; and generating, by use of the one or more processors, the wallet persistent state presentation based on the wallet persistent state selection.

BRIEF DESCRIPTION OF THE DRAWINGS

The accompanying appendices and/or drawings illustrate various non-limiting, example, innovative aspects in accordance with the present descriptions:

FIG. 1 shows a block diagram illustrating example cookie/states storage in some embodiments of the P-STATE;

FIG. 2 shows a block diagram illustrating example cookie/states storage data flow in some embodiments of the P-STATE;

FIG. 3 shows a logic flow diagram illustrating example cookie/states storage component in some embodiments of the P-STATE;

FIGS. 4A-4C show user interfaces illustrating example cookie/states storage in some embodiments of the P-STATE;

FIG. 5 shows a block diagram illustrating example cookie states search presentation data flow in some embodiments of the P-STATE;

FIG. 6 shows a logic flow diagram illustrating example cookie states search presentation component in some embodiments of the P-STATE;

FIG. 7 shows a block diagram illustrating example cookie states reload/recreate data flow in some embodiments of the P-STATE;

FIG. 8 shows a logic flow diagram illustrating example cookie states reload/recreate component in some embodiments of the P-STATE;

Figure 9:
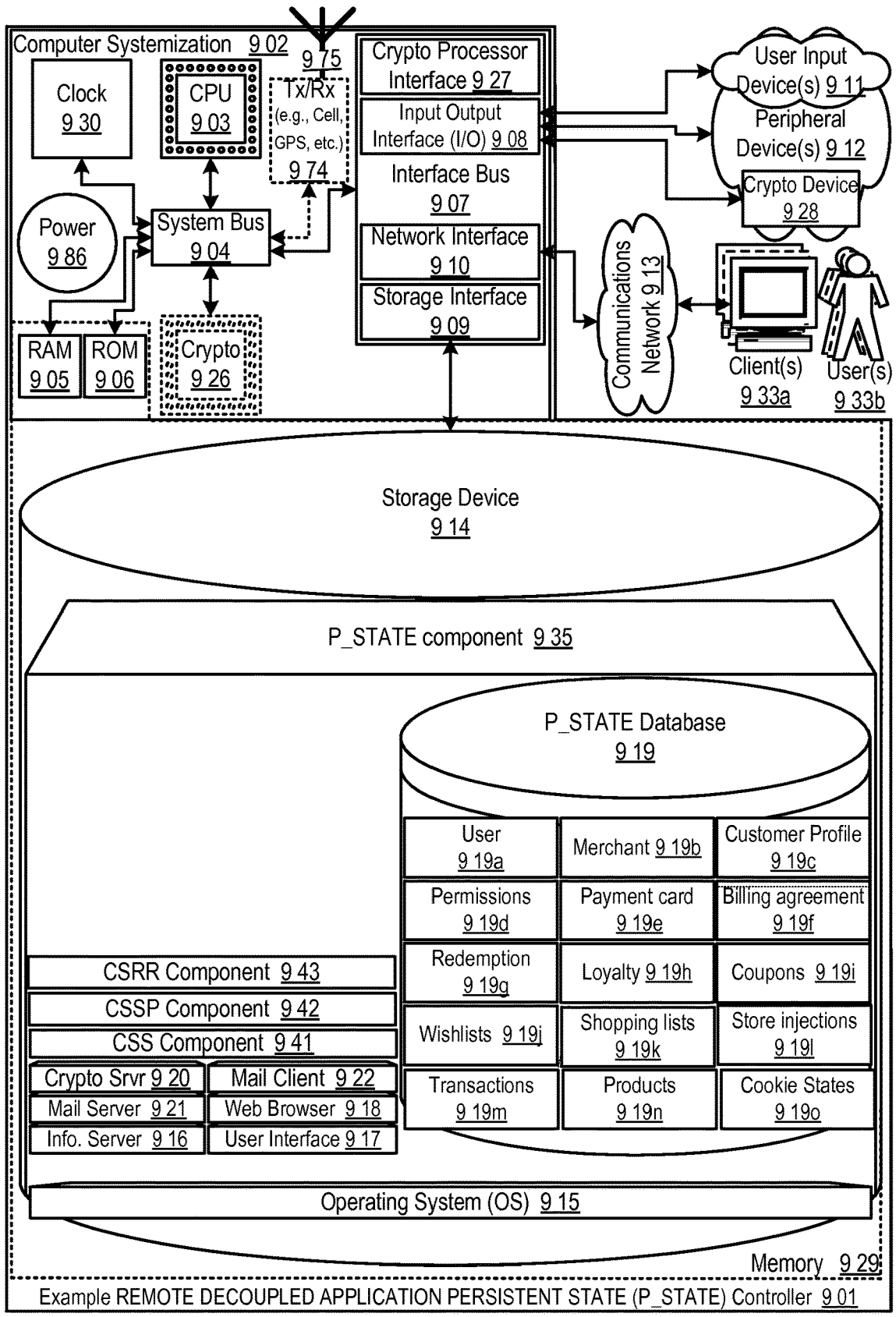
FIG. 9 shows a block diagram illustrating embodiments of a P-STATE controller.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Various embodiments of the P-STATE facilitate an enriched user experience for digital wallet consumers and allow the consumers to store the cookies and the states of their browsing and purchasing history with their digital wallet. In some embodiments, the digital wallet server serves as a cloud based storage to the merchant so that the wallet consumers may retrieve any states they had in the past with this merchant. In some embodiments, the cookie that the wallet stores may have multiple states and the consumer may choose go to any random state and view the page. In some embodiments, because the cookies and states are stored with the digital wallet server, it may be shared across platform. For example, a consumer is at the kiosk at a merchant physical store and desires to purchase the items he looked for last night on this merchant's website. The P-STATE may identify the consumer's digital wallet and bring the items up at the kiosk. For another example, a consumer is at a airplane and desires to watch the movie he purchased before at home. The P-STATE may retrieve his prior purchase cookies and recognize that he has already paid for that (although with another device) and provide the movie to him.

P-STATE

FIG. 1 shows a block diagram illustrating example cookie/states storage in some embodiments of the P-STATE. One possible cookie state 101 may include a timestamp of when the state takes place 103, the merchant 105, the shopping cart status 107, the shipper 109, the offer 111, the payment method 113, the checkout status 115, the search criteria (e.g., T-shirt) 117, the search results list 119, the purchase status 121, the platform the consumer is using (e.g., iphone, Android, merchant kiosk, point of sale, etc.) 123. The timestamp may be in the format of 2005-02-03.

The merchant of the order may be e-commerce sites such as Amazon. The search criteria may be the name of the product of interest, such as T-shirt. Another possible cookie state 125 may be the webpage providing the search results related to the search criteria (e.g., T-shirt) to the consumer. In some embodiments, it may also have the timestamp, merchant, shopping cart, shipper, offer, payment method, checkout status, purchase status, and order platform. Meanwhile, it may have an empty search criteria field 129, and some products in the search results list, such as blue T-shirt, pink T-shirt, and so forth. The reason may be that the search criteria may have been processed by the system and search results may have been generated. The consumer may choose to add one of the products 9 e.g., blue T-shirt) from the search results into the cart. In another possible cookie state 133, the timestamp, merchant, shopping cart, shipper, offer, payment method, search criteria, search results list, purchase status, and order platform may be the same as the previous cookie state. Meanwhile, its checkout status may include one or more items, the home address, payment method, and a link to the payment processing component. All possible cookie and states may be stored 137 to the cookies database 139. For example, the P-STATE server may issue PHP/SQL commands similar to the example listing below to store the cookies data 137 in a database:

```
<?PHP
header('Content-Type: text/plain');
mysql_connect("254.92.185.103",$DBserver,$password); // access database server
mysql_select("CookieStates.SQL"); // select database to append
mysql_query("INSERT INTO CookieStatesTable (state_session_ID cookie_session_ID timestamp merchant shopping cart shipper offer payment method checkout search search results purchase platform)
VALUES ($state_session_ID $cookie_session_ID timestamp( )$merchant $shopping_cart $shipper $offer $payment_method $checkout $search $search_results $purchase $platform"); // add data to table in database
mysql_close("CookieStates.SQL"); // close connection to database
?>
```

In some embodiments, a cookie may have multiple states. In some embodiments, after the consumer places an order or finishes browsing with this merchant, multiple states may be combined to one cookie.

FIG. 2 shows a block diagram illustrating example cookie/states storage data flow in some embodiments of the P-STATE. A user 201 may submit the purchase action input 211 to the client device 202. The purchase action input may include search, add to cart, pay and so forth. After receiving the purchase action input, the client device may perform the requested purchase action and generate cookies 215. Then the client device may store the cookie states 220 to the client cookie database 207. An example of the cookie state structure is discussed in message 230. Examples of PHP/SQL commands to store 220 may be similar to example 137. Following that the client device may update the wallet determination 225 and determine how often the P-STATE server (e.g, wallet server) may need to be updated with the cookies. If the P-STATE server needs updating, then the client device may send the cookie states update package 230 to the P-State server 205. An example cookies/states update package substantially in the form of a HTTP(S) POST message 230 including XML-formatted data, is provided below:

```
POST/updateacookiestates.php HTTP/1.1
Host: www.P-STATE.com
Content-Type: Application/XML
Content-Length: 667
<?XML version="1.0" encoding="UTF-8"?>
<cookie_states_update_package>
    <update_timestamp>2010-05-06 05:00</update_timestamp>
    <last_update_timestamp>2010-05-05 05:00</last_update_timestamp>
    <wallet_id>joesmith@gmail.com</wallet_id>
    <cookie_session_ID>123adg
        <statesessionID>1
        <timestamp>2010-05-05-09:12</timestamp>
        <merchant_id>A12345</merchant_id>
        <merchant>Amazon</merchant>
        <merchant_session_id>vme0345</merchant_session_id>
    <merchant_connection_server>159.2.8.45</merchant_connection_server>
        <shopping_cart></shopping_cart>
        <shipper></shipper>
        <offer></offer>
        <payment_method></payment_method>
        <checkout></checkout>
        <search>T-shirt</search>
        <search_results></search_results>
        <purchase></purchase>
        <platform></platform>
    </state_session_ID>
    <state_session_ID>2
        <timestamp>2010-05-05-09:30</timestamp>
        <merchant_id>A12345</merchant_id>
        <merchant>Amazon</merchant>
        <merchant_session_id>vme0345</merchant_session_id>
    <merchant_connection_server>159.2.8.45</merchant_connection_server>
        <shopping_cart></shopping_cart>
        <shipper></shipper>
        <offer></offer>
        <payment_method></payment_method>
        <checkout></checkout>
        <search>T-shirt</search>
        <search_results>1 Blue T-shirt, 2. Pink T-shirt</search_results>
        <purchase></purchase>
        <platform></platform>
    </state_session_ID>
    <state_session_ID>3
        <timestamp>2010-05-05-09:40</timestamp>
        <merchant_id>A12345</merchant_id>
        <merchant>Amazon</merchant>
        <merchant_session_id>vme0345</merchant_session_id>
    <merchant_connection_server>159.2.8.45</merchant_connection_server>
        <shopping_cart></shopping_cart>
        <shipper></shipper>
        <offer></offer>
        <payment_method> Visa 1234</payment_method>
        <checkout>1. Blue T-shirt, 2. Camera Total $320 Address: peace st. New York N.Y.</checkout>
        <search>T-shirt</search>
        <search_results></search_results>
        <purchase></purchase>
        <platform></platform>
```

```
</state_session_ID>
</cookie_session_ID>
<cookie_session_ID>523adg
  <statesessionID>1
    <timestamp>2011-05-05-09:12</timestamp>
    <merchant_id>B12345</merchant_id>
    <merchant>Bestbuy</merchant>
    <merchant_session_id>vme1345</merchant_session_id>
    <merchant_connection_server>259.2.8.45</merchant_connection_server>
    <shopping_cart>Computer XXXX</shopping_cart>
    <shipper>UPS</shipper>
    <offer></offer>
    <payment_method></payment_method>
    <checkout></checkout>
    <search></search>
    <search_results></search_results>
    <purchase></purchase>
    <platform>iphone</platform>
  </state_session_ID>
  <state_session_ID>2
    <timestamp>2011-05-05-10:30</timestamp>
    <merchant_id>B12345</merchant_id>
    <merchant>Bestbuy</merchant>
    <merchant_session_id>vme1345</merchant_session_id>
    <merchant_connection_server>259.2.8.45</merchant_connection_server>
    <shopping_cart>Computer XXXX</shopping_cart>
    <shipper>UPS</shipper>
    <offer>20% off</offer>
    <payment_method></payment_method>
    <checkout></checkout>
    <search></search>
    <search_results></search_results>
    <purchase></purchase>
    <platform> iphone </platform>
  </state_session_ID>
</cookie_session_ID>
</cookie_states_update_package>
```

After receiving the cookie states update package the P-State server may update the cookie states 234. Then the P-State server may store the cookie states 240 into the P-State cookies database 209. Examples of PHP/SQL commands to store 240 may be similar to example 137.

FIG. 3 shows a logic flow diagram illustrating example cookie/states storage component in some embodiments of the P-STATE. In some embodiments, the client may receive purchase action input, such as search, add to cart, and so forth 311. Then the client may determine whether the input includes a new merchant 313. If it does not include a new merchant, then the client may determine whether the transaction is complete 315. In some embodiments, it may determine whether a previous transaction is complete. If the transaction is not complete, then the client may determine if it is the first transaction 317. If the input includes a new merchant, or the transaction is complete, or it is the first transaction, then the client may set a new cookie flag 319. After that the client may create a new cookie 321. The client may also set the cookie flag to complete and store the cookie on the device 329. Then the client may create a new cookie state 325. After that and also if it does not involve a first transaction with the merchant 317, for each action that is queued 327, the client may create a new cookie state 325 and perform the received purchase action 323. Following that the client may store the cookie states to the client cookies database with performed action state information 331. Then the client may determine whether there is a wallet update quantum 333. If there is a wallet update quantum, then the client may update the wallet determination, such as to update every 5 minutes, or one hour, or 3 days, and so forth 335. After that the client may send cookie sates update package to the P-State server 337. Then the P-State server may update the cookie states 341. After that the P-State server may store the updated cookie states to the P-State cookies database 343. If ted is not a wallet update quantum, then the client may determine whether there is a next queued action 339. If there is a next queued action, then the client may receive purchase additional action input.

FIGS. 4A-4C show user interfaces illustrating example cookie/states storage in some embodiments of the P-STATE. Referring to FIG. 4A, in some embodiments, cookies and states (cookies and states may be referred to cookie states, cookies, or states in some instances) may be viewed in a timeline fashion. 405, 407, 409 are different cookie states and when the mouse lies on one state, a preview of this state may be seen 405. Cookies on the right 401 have a newer timestamp than the cookies on the left 403. Also a list of the cookies with file information may be shown underneath 411. In the preview window 405, you may choose different information to show. If you choose to view cart 413, you may see the merchant name, session id, timestamp, and a list of products in the cart. You may also search 415 in the cookies, view file info 423, preview the cookie 421, reload the cookie 419, and recreate the cookie 417. In some embodiments, reloading the cookie means the merchant still has the cookie loaded. The merchant may send the payload information and consumer's client device may load the cookie and generate for webpage or app's display. In some embodiments, recreating the cookie means the merchant may not have the cookie loaded. Based on the payload info in the stored cookie, the merchant may recreate the cookie and send to the consumer. The reloading and recreating features are discussed in more details in FIGS. 7 and 8.

Referring to FIG. 4B, in some embodiments, cookies and states are searchable. You may put in a search term 431, for example boot, the P_STATE may return you the cookies and states with "boot" in it 437.

Referring to FIG. 4C, in some embodiments, consumer may also view the cookies in a list view 451. Timestamp 455, product 457, price 459, merchant 461, platform 463, coupons 465, shippers 467, payment method, and other information may be shown. For some products, consumers may view it in different platforms (for example, iPad 477, and merchant kiosk 479). In some embodiments, the cookies and states are searchable 453. Users may choose different categories to search.

FIG. 5 shows a block diagram illustrating example cookie states search presentation data flow in some embodiments of the P-STATE. In some embodiments, a user 501 may submit the cookie states search criteria input 511 to the client device 502. After receiving the search criteria input, the client device may look up cookie state or states associated with the search criteria 515. After that it may generate a cookie states presentation 520. Alternatively the client device may submit a cookie states search request with search criteria 530 to the P-State server 505. An example cookie states search request substantially in the form of a HTTP(S) POST message 530 including XML-formatted data, is provided below:

```
POST/cookiestatessearch.php HTTP/1.1
Host: www.P-STATE.com
Content-Type: Application/XML
Content-Length: 667
```

```xml
<?XML version="1.0" encoding="UTF-8"?>
<cookie_states_search_request>
    <wallet_id>joesmith@gmail.com</wallet_id>
    <wallet_digital_certificate>****</wallet_digital_certificate>
    <search_target>cookies</search_target>
    <search_criteria>boots</search_criteria>
    <search_period_from>2005-01-03</search_period_from>
    <search_period_to>2006-01-03</search_period_to>
</cookie_states_search_request>
```

Then the P-State server may look up the cookie state or states associated with the search criteria 535. After that the P-State server may send the cookie states search results 540 back to the client device. An example cookie states search results substantially in the form of a HTTP(S) PUSH message 540 including XML-formatted data, is provided below:

```
PUSH/cookiestatessearchresults.php HTTP/1.1
Host: www.P-STATE.com
Content-Type: Application/XML
Content-Length: 667
<?XML version="1.0" encoding="UTF-8"?>
<cookie_states_search_results>
    <wallet_id>joesmith@gmail.com</wallet_id>
    <cookie_session_ID>123adg
        <state_session_ID>3
            <timestamp>2010-05-05-09:40</timestamp>
            <merchant_id>A12345</merchant_id>
            <merchant>Amazon</merchant>
            <merchant_session_id>vme0345</merchant_session_id>
        <merchant_connection_server>159.2.8.45</merchant_connection_server>
            <shopping_cart></shopping_cart>
            <shipper></shipper>
            <offer></offer>
            <payment_method> Visa 1234</payment_method>
            <checkout>1. baby boots 2. books Total $320
                Address: 123 peace st. New York N.Y.</checkout>
            <search></search>
            <search_results></search_results>
            <purchase></purchase>
            <platform></platform>
        </state_session_ID>
    </cookie_session_ID>
    <cookie_session_ID>523adg
        <state_session_ID>1
            <timestamp>2011-05-05-09:40</timestamp>
            <merchant_id>M12345</merchant_id>
            <merchant>Macy's</merchant>
            <merchant_session_id>vme3345</merchant_session_id>
        <merchant_connection_server>159.2.8.45</merchant_connection_server>
            <shopping_cart></shopping_cart>
            <shipper></shipper>
            <offer></offer>
            <payment_method> Visa 1234</payment_method>
            <checkout>1. leather boots 2. computer Total $920
                Address: 123 peace st. New York N.Y.</checkout>
            <search></search>
            <search_results></search_results>
            <purchase></purchase>
            <platform></platform>
        </state_session_ID>
    </cookie_session_ID>
</cookie_states_search_results>
```

The client device then may generate the cookie states presentation. Then the client device may display the results 525 to the user.

FIG. 6 shows a logic flow diagram illustrating example cookie states search presentation component in some embodiments of the P-STATE. The client may receive cookie states search criteria input 6oi. After that the client may look up cookie states associated with the search criteria 605. Then the client may determine whether the cookies are found 607. If the cookies are found, the client may load the cookie stats 609. If the cookies are not found, the client may send the cookie states search request with the search criteria to the P-State server 615. Following that the P-State server may look up the cookie state or states associated with the search criteria 620. Then the P-State server may send the cookie states search results to the client 625. After the client loads the cookie states or the P-State server sends the cookie states search results to the client, the client may generate cookie states presentation 630.

FIG. 7 shows a block diagram illustrating example cookie states reload/recreate data flow in some embodiments of the P-STATE. In some embodiments, the user may submit the cookie state(s) selection input 711 to the client device 702. Then the client device may determine the platform that is used, such as webpage, mobile app, and so forth, and load the cookies 715. After that the client device may reload or recreate the cookie state request message, such as payload cookie and states 720. An example reload/recreate cookie state request substantially in the form of a HTTP(S) POST message 720 including XML-formatted data, is provided below:

```
POST/reloadrecreatecookiestaterequest.php HTTP/1.1
Host: www.P-STATE.com
Content-Type: Application/XML
Content-Length: 667
<?XML version="1.0" encoding="UTF-8"?>
<reload_recreate_cookie_state_request>
    <merchant_id>A12345</merchant_id>
    <search_target>cookies</search_target>
    <search_criteria>
        <cookie_session_ID>123adg</cookie_session_ID>1
        <statesessionID>3</state_session_ID>
    </search_criteria>
    <search_period_from>2005-01-03</search_period_from>
    <search_period_to>2006-01-03</search_period_to>
</reload_recreate_cookie_state_request>
```

Then the merchant server 705 may determine if the selected cookie state is still loaded 725. Then the merchant server may load the selected cookie state 730 and send the reloaded cookie state response back to client, with info, for example, the webpage served or the mobile application payload 740. An example reload (or recreate) cookie state response substantially in the form of a HTTP(S) PUSH message 740 (or 745) including XML-formatted data, is provided below:

```
PUSH/reloadrecreatecookiestateresposne.php HTTP/1.1
Host: www.P-STATE.com
Content-Type: Application/XML
Content-Length: 667
<?XML version="1.0" encoding="UTF-8"?>
<reload_recreate_cookie_state_response>
    <state_on_server_status>reloaded</state_on_server_status>
    //Alternatively, the state_on_server_status may also be recreated
    <cookie_session_ID>123adg
        <state_session_ID>3
            <timestamp>2010-05-05-09:40</timestamp>
```

```
        <merchant_id>A12345</merchant_id>
        <merchant>Amazon</merchant>
        <merchant_session_id>vme0345</merchant_session_id>
    <merchant_connection_server>159.2.8.45</merchant_connection_server>
        <shopping_cart></shopping_cart>
        <shipper></shipper>
        <offer></offer>
        <payment_method> Visa 1234</payment_method>
        <checkout>1. baby boots 2. books Total $320
           Address: 123 peace st. New York N.Y.</checkout>
        <search></search>
        <search_results></search_results>
        <purchase></purchase>
        <platform></platform>
        </state_session_ID>
    </cookie_session_ID>
</reload_recreate_cookie_state_response>
```

The client may launch target for executing response payload, for example, open browser or application, and load payload in target 750 for display to the user 760. In an alternative embodiment, if the merchant server do not have the selected cookie loaded 725, the merchant server may recreate selected cookie state with payload cookie states (e.g., load cart, search, shipping, pay, etc.) 735 and send it back to the client 745. In another alternative embodiment, the merchant or the client may request the selected cookie from the P-STATE server.

FIG. 8 shows a logic flow diagram illustrating example cookie states reload/recreate component in some embodiments of the P-STATE. In some embodiments, the client may receive a cookie state selection input from the consumer 801. The client may then determine what platform was used to send the input (e.g., webpage, mobile device application, etc.). The client may then generate and send a reload/recreate cookie states request 805 to the merchant server 810. The merchant server may determine if selected cookie state is till loaded on the merchant server 815. If the cookie state is still loaded 822, the merchant server may load selected cookie state and sends reload cookie state response to the client 825. The response may also include a webpage server or application payload 830. Upon receiving the reload cookie state response, the client may launch a target for executing response payload (e.g., open a browser, a mobile device application) and load payload in target for display to the user 835. In some embodiments, if the cookie is no longer loaded at the merchant server 820, in an alternative embodiment, the merchant server may determine if the session can be recreated 840. If the session can be recreated, the merchant server may recreate selected cookie state with actions such as loading card, searching, adding shipping, etc. 855. The merchant server may then send recreate confirmation response message with webpage served or application payload to the client 860. The client may then laugh target and load payload in target 835. Alternatively, if the session can not be recreated 840 at the merchant server, the merchant may send a load cookie state request to the P-STATE server 845 and retrieve cookie states from the P-STATE server. Once the merchant receives cookie states from the P-STATE server 855, the merchant may recreate selected cookie state and send to client to load in target 835

P-STATE Controller

FIG. 9 shows a block diagram illustrating embodiments of a P-STATE controller. In this embodiment, the P-STATE controller 901 may serve to aggregate, process, store, search, serve, identify, instruct, generate, match, and/or facilitate interactions with a computer through various bi-directional linking technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the P-STATE controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The P-STATE controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing P-STATE controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the P-STATE controller and beyond through various interfaces. Should processing requirements dictate a greater amount speed and/or capacity, distributed processors (e.g., Distributed P-STATE), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the P-STATE may be achieved by implementing a microcontroller such as CAST's R8051XC2 microcontroller; Intel's MCS 51 (i.e., 8051 microcontroller); and/or the like. Also, to implement certain features of the P-STATE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the P-STATE component collection (distributed or otherwise) and/or features may be implemented via the microprocessor and/or via embedded components; e.g., via ASIC, coprocessor, DSP, FPGA, and/or the like. Alternately, some implementations of the P-STATE may be implemented with embedded components that are configured and used to achieve a variety of features or signal processing.

Depending on the particular implementation, the embedded components may include software solutions, hardware solutions, and/or some combination of both hardware/software solutions. For example, P-STATE features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the P-STATE features. A hierarchy of programmable interconnects allow logic blocks to be interconnected as needed by the P-STATE system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the P-STATE may be developed on regular FPGAs and then migrated into a fixed version that more resembles ASIC implementations. Alternate or coordinating implementations may migrate P-STATE controller features to a final ASIC instead of or in addition to FPGAs. Depending on the implementation all of the aforementioned embedded components and microprocessors may be considered the "CPU" and/or "processor" for the P-STATE.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the P-STATE thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the P-STATE controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed P-STATE), architectures may similarly be employed to pool, load balance, and/or otherwise increase the communicative bandwidth required by the P-STATE controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the P-STATE controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the P-STATE controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the P-STATE controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the P-STATE controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the P-STATE component(s) 935; cookie/states storage ("CSS") component 941; cookie states search presentation ("CSSP") component 942; and cookie/states reload/recreate ("CSRR") component 943; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the P-STATE controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the P-STATE controller to communicate with other entities through a communications network 913. Various communication protocols may be used by the P-STATE controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the P-STATE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the P-STATE database 919, operating systems, other program components, user interfaces, Web browsers, and/or the like.

Access to the P-STATE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the P-STATE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the P-STATE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the P-STATE enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the P-STATE.

Access to the P-STATE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the P-STATE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the P-STATE component to engage in secure transactions if so desired. The cryptographic component facilitates the secure accessing of resources on the P-STATE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The P-STATE Database

The P-STATE database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the P-STATE database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the P-STATE database is implemented as a data-structure, the use of the P-STATE database 919 may be integrated into another component such as the P-STATE component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-0. A user table 919a includes fields such as, but not limited to: a user_ID, name, home_address, work_address, telephone_number, email, merchant_ID client_id, account_id, and/or the like. The user table may support and/or track multiple entity accounts on a P-STATE. A merchant/service provider table 919b includes fields such as, but not limited to: merchant_ID, merchant_name, merchant_location, merchant_address, merchant_category_code, merchant_api_key, loyalty_program_ID and/or the like. A customer profile table 919c includes fields such as, but not limited to: user_ID, merchant_ID, payment_card_ID, preferred_payment_type, demographics, prefetch_preferences, and/or the like. A permissions table 919d includes fields such as, but not limited to: customer ID, transaction execution authorization status, confirmation authorization status, billing authorization status, subscription payment authorization status, and/or the like. A payment card table 919e includes fields such as, but not limited to: payment_card_id, user_id, identifier, brand, expiration date, spending limit, billing address, issuer, name, nick name, loyalty program ID, and/or the like. A billing agreement table 919f includes fields such as, but not limited to: customer_id, billing_id, billing_date, billing_amount_limit, confirmation_requirement, authentication_level, billing_authorization_status, and/or the like. A redemption table 919g includes fields such as, but not limited to: customer_id, loyalty_program_id, coupon_id, redemption_date, redemption_time, redemption_amount, redemption_type, transaction_id, and/or the like. A loyalty table 919h includes fields such as, but not limited to: loyalty program ID, rules, loyalty currency amount, loyalty expiry date, transaction ID, and/or the like. A coupons table 919i includes fields such as, but not limited to: coupon ID, coupon value, coupon accepted location, coupon expiry date, and/or the like. A wish list table 919j includes fields such as, but not limited to: wish list ID, merchant ID, item ID, and/or the like. A shopping lists table 919k includes fields such as, but not limited to: shopping_lists_ID, merchant_ID, item_ID, transaction_ID, and/or the like. A store injections table 919l includes fields such as, but not limited to: store_injection_id, merchant_id, item_id, and/or the like. A transaction table 919m includes fields such as, but not limited to: transaction_id, merchant_id, user_id, session_id, date, time, item_model, manufacturer, price, item_id, and/or the like. A products table 919n includes fields such as, but not limited to: product_id, merchant_id, item_id, and/or the like. A cookie_states table 919o includes fields such as, but not limited to: cookie_states_id, cookie_session_id, states_session_id, merchant_id, timestamp, shopping_list_id, payment_method_id, payment_card_id, search, search_results, platform, checkout, shipper, offer, and/or the like.

An Account table 919e includes fields such as, but not limited to: account_id, account_PAN, account_type, brand, expiration date, spending limit, billing address, issuer, name, nick name, loyalty program ID, and/or the like. A third parties table 919f includes fields such as, but not limited to: $3^{rd}$_parties_ID, $3^{rd}$_parties_name, $3^{rd}$_parties_type, $3^{rd}$_parties_location, $3^{rd}$_parties_address, $3^{rd}$_parties_api_key, prefetch_request_id, user_id, merchant_id, security_credentials, and/or the like. A redemption table 919g includes fields such as, but not limited to: customer ID, loyalty program ID, coupon ID, redemption date, redemption time, redemption amount, redemption type, transaction ID, and/or the like. A loyalty table 919h includes fields such as, but not limited to: loyalty program ID, rules, loyalty currency amount, loyalty expiry date, transaction ID, and/or the like. A coupons table 919i includes fields such as, but not limited to: coupon ID, coupon value, coupon accepted location, coupon expiry date, and/or the like. A wish list table 919j includes fields such as, but not limited to: wish list ID, merchant ID, item ID, and/or the like. A plug-ins table 919k includes fields such as, but not limited to: plug-in ID, plug-in provider ID (merchant ID, issuer ID, etc.), plug-in type, plug-in function, plug-in installation guide, plug-in authorization, plug-in restrictions, and/or the like. A client cookies table 919l includes fields such as, but not limited to: client_cookie_id, session_ID, client_id, user_id, merchant_id, wallet_id, merchant_login, wallet_login, cookie_timestamp, cookie_address, and/or the like. An account balance table 919m includes fields such as, but not limited to: user_ID, Account_ID, issuer, api key, balance amount, balance retrieval date/time, and/or the like. and/or the like. A payments table 919n includes fields such as, but not limited to: user_id, billing ID, billing date, billing amount, Account_ID, authentication level, and/or the like. A prefetch requests table 919o includes fields such as, but not limited to: prefetch_requests_id, user_id, client_id, $3^{rd}$_parties_id, api_id, prefetch_info_type, prefetch_info_value, and/or the like.

In one embodiment, the P-STATE database may interact with other database systems. For example, employing a distributed database system, queries and data access by search P-STATE component may treat the combination of the P-STATE database, an integrated data security layer database as a single database entity.

In one embodiment, user programs may contain various user interface primitives, which may serve to update the P-STATE. Also, various accounts may require custom database tables depending upon the environments and the types of clients the P-STATE may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-0. The P-STATE may be configured to keep track of various settings, inputs, and parameters via database controllers.

The P-STATE database may communicate to and/or with other components in a component collection, including itself, and/or facilities of the like. Most frequently, the P-STATE database communicates with the P-STATE component, other program components, and/or the like. The database may contain, retain, and provide information regarding other nodes and data.

The P-STATEs

The P-STATE component 935 is a stored program component that is executed by a CPU. In one embodiment, the P-STATE component incorporates any and/or all combinations of the aspects of the P-STATE that was discussed in the previous figures. As such, the P-STATE affects accessing, obtaining and the provision of information, services, transactions, and/or the like across various communications networks.

The P-STATE transforms inputs such as purchase action input (e.g., 211), cookie states search criteria input (e.g., 511), and cookie states selection input (e.g., 711) via P-STATE components such as cookie/states storage ("CSS") component 941; cookie states search presentation ("CSSP") component 942; and cookie/states reload/recreate ("CSRR") component 943, into cookie state presentation (e.g., 525, 760) outputs.

The P-STATE component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the P-STATE server employs a cryptographic server to encrypt and decrypt communications. The P-STATE component may communicate to and/or with other components in a component collection, including itself, and/or facilities of the like. Most frequently, the P-STATE component communicates with the P-STATE database, operating systems, other program components, and/or the like. The P-STATE may contain, communicate, generate, obtain, and/or provide program component, system, user, and/or data communications, requests, and/or responses.

Distributed P-STATEs

The structure and/or operation of any of the P-STATE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the P-STATE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the P-STATE controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication $sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
  $input=
  $input=socket read($client, 1024);
  $data.=$input;
} while ($input !=" ");
// parse data to extract variables
$obj=json_decode($data, true);
// store input data in a database
mysgl_connect("201.408.185.132",$DBserver,$password); // access database server mysgl_select("CLIENT_DB.SQL"); // select database to append
mysgl_query("INSERT INTO UserTable (transmission) VALUES ($data)"); // add data to UserTable table in a CLIENT database mysglclose("CLIENTDB.SQL");
// close connection to database
?>
```

Also, the following resources may be used to provide example embodiments regarding SOAP parser implementation:
 http://www.xay.com/perl/site/lib/SOAP/Parser.html
 http://publib.boulder.ibm.com/infocenter/tivihelp/v2r1/index.jsp?topic=/com.ibm.IBMDI.doc/referenceguide295.htm
and other parser implementations:
 http://publib.boulder.ibm.com/infocenter/tivihelp/v2r1/index.jsp?topic=/com.ibm.IBMDI.doc/referenceguide259.htm
all of which are hereby expressly incorporated by reference.

In order to address various issues and advance the art, the entirety of this application for REMOTE DECOUPLED APPLICATION PERSISTENT STATE APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a P-STATE individual and/or enterprise user, database configuration and/or relational model, data type, data transmission and/or network framework, syntax structure, and/or the like, various embodiments of the P-STATE, may be implemented that enable a great deal of flexibility and customization. For example, aspects of the P-STATE may be adapted for system latency reduction. While various embodiments and discussions of the P-STATE have been directed to prefetching and on-demand fetching user account information, however, it is to be understood that the embodiments described herein may be readily configured and/or customized for a wide variety of other applications and/or implementations.

What is claimed is:

1. A method comprising:
    receiving, at a persistent state server, at least one selection from a first user device associated with a user;
    creating and storing, at the persistent state server remote from the first user device, a first cookie associated with one or more states of a user account of the user that reflects the at least one selection from the first user device;
    receiving, at the persistent state server from a second user device remote from the persistent state server, a request for state data related to the one or more states of the user account;
    identifying, by the persistent state server, the first cookie in response to the request for state data;
    determining, by the persistent state server, a platform type of the second user device;
    generating, by the persistent state server, a second cookie compliant with the platform type of the second user device based on the first cookie, the second cookie including instructions to present the at least one selection on the second user device via the platform type of the second user device; and
    in response to receiving the request for state data, sending the generated second cookie from the persistent state server to the second user device for
    launching, by the persistent state server, a target for executing the second cookie.

2. The method of claim 1, wherein the first cookie stores a state of the user's selection history associated with the user account.

3. The method of claim 2, wherein the first cookie contains multiple states.

4. The method of claim 3 further comprising providing cloud-based storage to a merchant associated with the at least one selection such that the user can retrieve any of the multiple states associated with the merchant.

5. The method of claim 1, wherein the first cookie is stored in a database associated with the user account.

6. The method of claim 5 further comprising providing a user interface for searching the database.

7. The method of claim 1, wherein the first cookie is used to recognize that the user has previously paid for the at least one selection.

8. The method of claim 1, wherein the first cookie includes at least one of a timestamp of when at least one selection took place, a merchant associated with the at least one selection, purchase status, or a platform type of the first user device.

9. The method of claim 1, wherein multiple states of a user's selection history are combined into the first cookie.

10. The method of claim 9 further comprising providing a preview window to facilitate viewing the multiple states included in the first cookie.

11. A non-transitory computer readable medium storing instructions that, when executed, cause an apparatus at least to perform:
    receiving, at a persistent state server, at least one selection from a first user device associated with a user;
    creating and storing, at the persistent state server remote from the first user device, a first cookie associated with a one or more states of a user account of the user that reflects the at least one selection from the first user device;
    receiving, at the persistent state server from a second user device remote from the persistent state server, a request for state data related to the one or more states of the user account;
    identifying, by the persistent state server, the first cookie in response to the request for state data;
    determining, by the persistent state server, a platform type of the second user device;
    generating, by the persistent state server, a second cookie compliant with the platform type of the second user device based on the first cookie, the second cookie including instructions to present the at least one selection on the second user device via the platform type of the second user device; and
    in response to receiving the request for state data, sending the generated second cookie from the persistent state server to the second user device for
    launching, by the persistent state server, a target for executing the second cookie.

12. The non-transitory computer readable medium of claim 11, wherein the first cookie stores a state of the user's selection history associated with the user account.

13. The non-transitory computer readable medium of claim 12, wherein the first cookie contains multiple states.

14. The non-transitory computer readable medium of claim 13 further comprising providing cloud-based storage to a merchant associated with the at least one selection such that the user can retrieve any of the multiple states associated with the merchant.

15. The non-transitory computer readable medium of claim 11, wherein the first cookie is stored in a database associated with the user account.

16. The non-transitory computer readable medium of claim 15, further comprising instructions causing the apparatus to perform providing a user interface for searching the database.

17. The non-transitory computer readable medium of claim 11, wherein the first cookie is used to recognize that the user has previously paid for the at least one selection.

18. A platform-specific cookie generating apparatus comprising:
    a memory; and
    a processor disposed in communication with said memory, and configured to issue a plurality of processing instructions stored in the memory, wherein the processor issues instructions to:
    receive, at a persistent state server, at least one selection from a first user device associated with a user;
    create and store, at the persistent state server remote from the first user device, a first cookie associated with a one or more states of a user account of the user that reflects the at least one selection;
    receive, at the persistent state server from a second user device remote from the persistent state server, a request for state data related to the one or more states of the user account;

identify, by the persistent state server, the first cookie in response to the request for state data;

determine, by the persistent state server, a platform type of the second user device;

generate, by the persistent state server, a second cookie compliant with the platform type of the second user device based on the first cookie, the second cookie including instructions to present the at least one selection on the second user device via the platform type of the second user device; and in response to receiving the request for state data, sending the generated second cookie from the persistent state server to the second user device for launch, by the persistent state server, a target for executing the second cookie.

19. The apparatus of claim 18, wherein the first cookie stores a state of the user's selection history associated with the user account.

20. The apparatus of claim 19, wherein the first cookie contains multiple states.

* * * * *